United States Patent
Yang et al.

[11] Patent Number: 5,987,028
[45] Date of Patent: Nov. 16, 1999

[54] MULTIPLE CHANNEL ATM SWITCH

[75] Inventors: Muh-Rong Yang, Taipei; Gin-Kou Ma, Chutung, both of Taiwan

[73] Assignee: Industrial Technology Research Insitute, Taiwan, Taiwan

[21] Appl. No.: 08/854,394

[22] Filed: May 12, 1997

[51] Int. Cl.[6] .......................... H04L 12/50; H04L 12/28; H04L 12/56; H04Q 11/06
[52] U.S. Cl. .......................... 370/380; 370/414; 370/416
[58] Field of Search .......................... 370/395, 380, 370/381, 411, 412, 414, 415, 416

[56] References Cited

U.S. PATENT DOCUMENTS

| | | | |
|---|---|---|---|
| 4,761,780 | 12/1986 | Bingham et al. | 370/411 |
| 4,984,264 | 1/1991 | Katsube | 370/230 |
| 5,150,358 | 9/1992 | Punj et al. | 364/491 |
| 5,179,551 | 1/1993 | Turner | 370/398 |
| 5,179,556 | 1/1993 | Turner | 370/233 |
| 5,210,743 | 5/1993 | Eilenberger et al. | 370/422 |
| 5,216,668 | 8/1991 | Zhang | 370/411 |
| 5,229,990 | 7/1993 | Teraslinna | 370/218 |
| 5,251,205 | 10/1993 | Callon et al. | 370/392 |
| 5,271,003 | 12/1993 | Lee et al. | 370/422 |
| 5,274,360 | 12/1993 | Watanabe et al. | 340/686.1 |
| 5,280,480 | 1/1994 | Pitt et al. | 370/256 |
| 5,287,347 | 2/1994 | Spanke | 370/235 |
| 5,291,477 | 3/1994 | Liew | 370/238 |
| 5,295,137 | 3/1994 | Jurkevich | 370/389 |
| 5,307,413 | 4/1994 | Denzer | 380/49 |
| 5,311,513 | 5/1994 | Ahmadi et al. | 370/230 |
| 5,327,552 | 7/1994 | Liew | 370/218 |
| 5,335,269 | 8/1994 | Steinlicht | 379/269 |
| 5,341,366 | 8/1994 | Soumiya et al | 370/233 |
| 5,359,538 | 10/1994 | Hui et al. | 364/491 |
| 5,369,707 | 11/1994 | Follendore, III | 380/25 |
| 5,381,407 | 1/1995 | Chao | 370/23 |
| 5,389,748 | 2/1995 | Burke et al. | 187/247 |
| 5,392,279 | 1/1993 | Taniguchi | 370/60 |
| 5,396,491 | 10/1992 | Newman | 370/355 |
| 5,416,769 | 7/1993 | Karol | 370/414 |
| 5,420,857 | 5/1995 | Jurkevich | 370/409 |
| 5,421,031 | 5/1995 | De Bey | 455/5.1 |
| 5,452,350 | 9/1995 | Reynolds et al. | 370/220 |
| 5,459,716 | 10/1995 | Fahim et al. | 370/228 |
| 5,461,615 | 10/1995 | Henrion | 370/355 |
| 5,463,616 | 10/1995 | Kruse et al. | 370/276 |
| 5,475,831 | 12/1995 | Yoshida et al. | 395/500 |
| 5,483,461 | 1/1996 | Lee et al. | 364/490 |
| 5,487,170 | 1/1996 | Bass et al. | 370/412 |
| 5,500,858 | 3/1996 | McKeown | 370/412 |
| 5,570,348 | 3/1995 | Holden | 370/414 |
| 5,689,506 | 1/1996 | Chiussi et al. | 370/388 |
| 5,724,351 | 7/1995 | Chao et al. | 370/395 |
| 5,838,679 | 7/1995 | Kim et al. | 370/395 |

OTHER PUBLICATIONS

Thomas D. Ndousee: Fuzzy Neural Control of Voice Cells in ATM Networks, IEEE Journal on Selected Areas in Communications, vol. 12, No. 9, Dec., 1994, pp. 1488–1494 discussed on pp. 7, 11 and 15.

Roch Guerin, Hamid Ahmadi, and Mahmoud Naghshineh, Equivalent Capacity and Its Application to Bandwidth Allocation in High–Speed Networks, IEEE Journal on Selected Areas in Communications, vol. 9, No. 7, Sep., 1991, pp. 968–981 discussed on pp. 7–8.

(List continued on next page.)

*Primary Examiner*—Chau Nguyen
*Assistant Examiner*—Phuongchau Ba Nguyen
*Attorney, Agent, or Firm*—Proskauer Rose LLP

[57] ABSTRACT

A system and method are provided for routing received cells through a switch fabric. A plurality of output channels are organized into a plurality of channel groups, wherein each of the channels groups is associated with one or more unique output ports of a Benes network. A plurality of cells destined to one or more of the plurality of channel groups is received at plural input queues. A different output port of the Benes network is selected for one or more of the input queues that contains a cell. Then, one cell is switched from each of one or more input queues through the Benes network to the respective selected output port.

23 Claims, 7 Drawing Sheets

OTHER PUBLICATIONS

San–qi Li and Song Chong, Fundamental Limits of Input Rate Control in High Speed Network, Dept. of Electrical and Computer Eng'g, University of Texas at Austin, pp. 662–671 discussed on pp. 7 and 9–10.

Allen R. Bonde, Jr. and Sumit Ghosh, A Comparative Study of Fuzzy Versus "Fixed"Thresholds for Robust Queue Managment in Cell–Switching Networks, IEEE/ACM Transactions on Networking, vol. 2, No. 4, Aug., 1994, pp. 337–344 discussed on pp. 7, 11 and 15; and.

M. De Pryker, Asynchronous Transfer Mode Solution for Broadband ISDN, 2d ed., ch. 2.4.5.4, pp. 84–87 (1995) discussed on p. 2.

A. Hiramatsu, ATM Communications Network Control by Neural Networks, IEEE Trans. on Neural Nets., vol. 1, No. 1, 1990, pp. 122–130.

Siemens Aktiengessellschaft, Telephone Traffic Theory Tables and Charts, pp. 17, 29 (1970).

(a) Path: 00 101

(b) Path: 01 101

(c) Path: 10 101

(d) Path: 11 101

MULTIPLE CHANNEL ATM SWITCH

RELATED APPLICATION

The subject matter of this application is related to the subject matter of the following patent application:

U.S. patent application Ser. No. 08/854,395, entitled, "An Enhanced Partially-Self Routing Algorithm For Controlling Benes Networks" filed on even date herewith for Muh-rong Yang and GinKuo Ma.

The above-listed patent application is commonly assigned to the assignee of this application and is incorporated herein by reference.

FIELD OF THE INVENTION

The present invention is directed to switches in communications networks. In particular, the present invention is directed to an improved Benes network that may be employed, for example, in an asynchronous transfer mode network.

BACKGROUND OF THE INVENTION

For sake of clarity, the discussion of the background of the prior art is divided into the following sections: (1) ATM Communication Networks, (2) Multiple Channel ATM Switches and (3) Benes Networks.

ATM COMMUNICATION NETWORKS

FIG. 1 depicts an asynchronous transfer mode (ATM) communications network 10. The invention is illustrated herein for a broadband integrated service digital network 10 (B-ISDN) although the invention is equally applicable to other kinds of ATM capable communications networks 10 such as synchronous optical networks (SONET). Furthermore, the model of a telephone network is used to illustrate the invention although the invention is also applicable to cable television networks, computer data networks, etc. The communications network 10 has plural nodes n1, n2, n3, n4, n5, n6, n7, n8, n9, n10, n11 and n12 which are interconnected by communication links. The communication links may include unshielded twisted pairs of wires, coaxial cables, optical fibers, satellite transponders, switches, etc. In the communications network 10, the nodes n1, n2, n3, n4, n5 and n6 are terminal equipments or TE's. For example, the TE's are customer premises equipments or CPE's such as telephones, set top boxes, cable television head ends or host computers. The nodes n7 and n8 are network termination units or NT's. The nodes n9, n10, n11 and n12 are, for example, central office switches which include ATM switches.

Communication is achieved in the communication network 10 by transmitting bitstreams on the links. Each bitstream is organized into fixed length time slots. Each node that desires to communicate writes fixed length packets called "cells" into the timeslots. FIG. 2 depicts an illustrative cell 20. The cell 20 has a header portion 22 into which the node writes overhead control information and a payload portion 24 into which the node writes a message to be conveyed. The node which desires to transmit a cell writes the cell thus generated into a particular time slot of the bitstream transmitted on a selected outgoing link.

According to ATM, communication is achieved by transmitting cells that contain messages along a sequence of nodes of the communications network 10. Specifically, the cells are transmitted via a sequence of individual connections between pairs of nodes of the communications network. See M. De Pryker, Asynchronous Transfer Mode Solution For Broadband ISDN, 2d ed., ch. 2.4.5.4, p. 84–87 (1995). This sequence of connections is illustratively predefined during a set up procedure when the communication is initiated. For example, to enable communication between the node n1 and the node n4, the following sequence of connections between nodes may be set up from the node n1 to the node n4:

node n1→node n7→node n9→node n10→node n11→node n8→node n4

Likewise, a return sequence of connections between nodes may be set up from the node n4 to the node n1 as follows:

node n4→node n8→node n11→node n12→node n10→node n9→node n7→node n1.

The node n1 or n4 which generates cells for transmission is referred to as a source node. The node n4 or n1 which is the ultimate intended recipient of the cells is referred to as the destination node. Each other node n7, n9, n10, n11, n8 or n12 is an intermediate node.

A virtual channel (VC) is defined as a communication channel dynamically allocated by a node for transmitting cells of a particular connection to a second device. The collection of all VC's of a sequence of connections is referred to as a virtual channel connection (VCC). In setting up a sequence of connections, a VCC identifier is assigned to the communication. Each node (e.g., the node n8) in the sequence of nodes (e.g., n1, n7, n9, n10, n11, n8, n4) allocates a virtual channel for conveying cells to the next node in the sequence of nodes for the communication (e.g., the node n4). Each node of the sequence of nodes creates an entry in a routing table for each communication. Each entry is indexed by the VCC identifier of the respective communication and contains information regarding how to transmit received (or newly generated) cells to the next node of the sequence of nodes. For instance, the indexed routing table entry may contain an indication of the virtual channel for routing the cell, such as a virtual channel identifier (VCI).

Once the sequence of connections is set up, the source node (e.g., n1) generates one or more cells 20. The source node n1 writes the VCC identifier assigned to the communication in the cell header 22 and messages to be conveyed to the destination node (e.g., n4) in the cell payload 24. The node n1 then writes the generated cells 20 into particular timeslots of an outgoing bitstream transmitted to the next node (e.g., node n7) of the sequence of nodes for that communication. Each intermediate node (e.g., the node n7) which receives the cell 20, utilizes the VCC identifier indication of how to route the cell to the next node (e.g., the VC indication of node n9). The cell is then routed on the appropriate outgoing VC to the next node (e.g., the node n9). This process is repeated at each intermediate node (e.g., n9, n10, n11 and n8) until the cell arrives at the destination node n4.

Note also that the ATM protocol permits two nodes to set up semi-permanent connections for conveying multiple simultaneous VCC's between the nodes. Such semi-permanent connections are referred to as virtual paths (VP's). VP's are illustratively also designated in each cell header by a respective virtual path identifier (VPI). Like the VCC, a virtual path connection (VPC) is defined as the collection of all VP's of a sequence of VP's in a communication. In general, routing is performed based on the VPC and then the VCC although the VPC routing may be idle if no VP set up for carrying the specific communication. See M. De Pryker, Asynchronous Transfer Mode Solution For Broadband ISDN, 2d ed., ch. 3.2.2, p. 104–105 (1995).

In transmitting cells on VC's, each node writes a cell into a time slot of an outgoing bitstream destined to another node, which time slot is allocated for the VC. Likewise, each node selectively reads cells from timeslots of received incoming bitstreams and performs the same writing operation to other outgoing bitstreams.

FIG. 3 shows a basic architecture of an intermediary node, e.g., the node n10. As shown, the node has input buffers 52 for storing cells prior to routing and output buffers 54 for storing cells after routing (pending transmission) although other buffering configurations are also possible. Communication set-up request cells are received via input links from other nodes at a connection admission controller 51. The connection admission controller 51 determines whether or not the newly requested communication can be accommodated. If the newly requested communication can be accommodated, the connection admission controller 51 allocates resources (e.g., bandwidth) for the communication. In performing these functions, the connection admission controller 51 may examine the "queue length" or current occupancy of the input and output buffers 52 and 54.

After a communication is "admitted" according to the above described process, information bearing cells are received on the input links. Cells received on each input link are stored in a respective queue of the input buffers 52. These cells are then fed from the input queues to a respective input port of a cell switch fabric 53. The cell switch fabric 53 routes the cells received on each of its input ports to a desired output port of the switch fabric 53 associated with a specific output link (or cell slot thereof). The cells outputted from each output port of the switch fabric 53 are first buffered in a respective output queue of the output buffers 54 (associated with that switch fabric output port and output link). The cells are then outputted from each output queue onto its respective output link.

Note that the purpose of the switch fabric 53 is to selectively switch or route cells from an input link or cell slot to a desired (or respective destination) output link or cell slot. Desirably, multiple inputted cells are switched to their respective outputs in parallel with minimal delay. Note also that the switch fabric 53 advantageously dynamically varies the routing of input ports to output ports to suit the destination output links/cell slots of the cells inputted to the switch fabric 53 at any moment of time.

MULTIPLE CHANNEL ATM SWITCHES

The class of ATM switches that establish a switch path between each input channel (input VC or VP) and each output channel (output VC or VP) may be referred to as single channel switches. Throughput in such switches can be severely limited by factors such as internal blocking, output contention and head of line blocking. Internal blocking arises when the switch fabric cannot be placed in a state that routes all cells simultaneously to their respective destinations because the cells contend to use the same resource. For example, it is possible in certain switch fabrics that two cells contend to set the same switch into mutually incompatible states. Output contention occurs when multiple cells to be routed in parallel are to be outputted at the same output port of the switch fabric. Since only one cell can be outputted to a single outgoing link or VC at once, the cells cannot be routed in parallel. As a result, some jitter or delay may be incurred by the cells contending to be outputted at the same output port of the switch fabric. Head of line blocking arises where a cell at the head of an input queue (referred to as "HOL" or "head of line" cell) cannot be immediately switched through the switch fabric but is rather delayed. Each cell in the same queue also incurs the delay imposed on the HOL cell (and possibly other delays).

An important issue for ATM is the development of a switching methodology that can support the very high bandwidth transmission associated with light wave technology. The transmission rate over optical fibers has reached tens of Gb/s and is likely to increase in the coming years. On the other hand, the processing speed of electronic switches remains substantially slower. Such a mismatch between optical transmission rate and electronic switch processing speed creates a bottleneck at the switching nodes.

Multichannel switches have been proposed to alleviate the processing speed constraint of electronic switches. Multichannel switches can provide higher performance (e.g., higher throughput, lower cell loss probability, lower delay) by exploiting the concept of channel grouping. Instead of being routed to a specific output channel (VC or VP), a cell is routed to any output channel belonging to an appropriate channel group. In ATM, a session is established by the assignment of a virtual circuit (including VCC and VPC). As noted above, the virtual circuit is defined in terms of a set of VC's and VP's in transmission links providing connections between the two end point nodes of the session. However, many of the benefits associated with connection-oriented services do not require that the connection be specified at the VC or VP level. Rather, it is sufficient to specify the path of the connection, not the specific VC or VP within the path. This implies that a cell can be routed to any one of a group of VC's or VP's that connect between the same pair of switches. Any inter-switch connection is likely to be in the range of multiple Gb/s, e.g., 2.4 Gb/s via an OC-48 connection of SONET. This corresponds to a number of VC's or VP's at 155 or 620 Mb/s. A channel group may be defined as a collection of these VC's or VP's transmitted over a single link.

A multiple channel switch is proposed in A. Pattavina, *Multichannel Bandwidth Allocation in a Broadband Packet Switch,* IEEE J. on Sel. Areas in Comm., vol. 6, no. 9, p. 1489–1494, December, 1988, based on the Batcher-Banyan network. This switch requires $O((\log_2 N)^2)$ stages of interconnected 2×2 switches (or β elements) for N input channels. The β elements can switch in the cross (upper input switched to lower output and lower input switched to upper output) or bar (upper input switched to upper output and lower input switched to lower output) states. The switch architecture employs a three phase algorithm to allocate bandwidth. FIG. 4 illustrates the architectural design of the multiple-channel switch 60 and FIG. 5 shows examples of a 16×16 Batcher Network and a 16×16 Banyan Network of FIG. 4. In operation, a channel allocation network 61 receives inputted cells and determines (based on the destination of the cells) the channel group to which the cells should be routed. The cells are then stored in input queues 62. The HOL cells of all of the queues 62 are outputted in parallel to the Batcher network 63. The Batcher network 63 is formed from β elements 63-1 or individual switch circuits interconnected to sort the inputted cells according to the order of the output port destination address. For instance, suppose the cells inputted on input ports 0, 1 and 4 of the switch fabric 60 are destined to output ports 3, 7 and 2, respectively, of the switch fabric 60. The Batcher network 63 outputs from its intermediate output ports 0, 1 and 2 the cells of input ports 4, 0 and 1 respectively, destined to outputs 2, 3 and 7, respectively. In FIG. 5, the sorting operation is denoted by an arrow wherein the arrow indicates the outlet to which the larger of the two inputs is routed.

The Banyan network 64 is a self routing network constructed from 2×2 β elements 64-1 as shown. Each β element switches the inputted cell based on a specific bit of the destination address (in a similar fashion as discussed for Benes networks below).

Note that feedback paths are provided from the output of the banyan network 64 to the input queues 62. Also, feedback paths are provided from the output of the Batcher network 63 to the channel allocation network 61 and the input queues 62. The purpose of the feedback paths to the input queues 62 is to feedback cells that cannot be routed to their respective output ports as a result of output contention. In particular, cells outputted from the Batcher network 63 are sorted according to order of destination. A single layer of comparators may be used to compare destination addresses of cells outputted from adjacent intermediate output ports of the Batcher network 63. If two or more cells have the same output port then a first cell with such an output port is inputted to the Banyan network 64 but the remaining cells are fed back to the input queues 62 for re-routing. Such a feedback architecture is sometimes referred to as a "trap" network. See M. De Pryker, Asynchronous Transfer Mode Solution For Broadband ISDN, 2d ed., ch. 4.4.2.2, p. 214–216 (1995)

P. Lau & A. Leon-Garcia, *Design and Analysis of a Multilink Access Subsystem Based on the Batch-Banyan Network Architecture*, IEEE Trans. on Comm., vol. 40, p. 1757–1766, November, 1992 discloses a switch fabric that reduces the complexity of the bandwidth allocation procedure of the Batcher-Banyan multiple channel switch fabric. The disadvantage of this switch fabric and the switch fabric disclosed in the Pattavina reference is that many β elements are required to produce the switch fabric. Both of these networks also have a very high set-up time for placing the β elements into the correct state for simultaneous routing of packets or cells.

R. Cruz, *The Statistical Data Fork: A Class of Broadband Multichannel Switches*, IEEE Trans. on Comm., vol. 40, no. 10, p. 1625–1634, October, 1992, discloses a switch that uses deflection routing in an omega network of $\log_2 N$ stages. FIG. 6 illustrates this multiple-channel switch 65 and an example of an 16×16 randomization network 66. Because the omega network 67 may mis-route packets/cells to the wrong output ports, feedback lines to the inputs of the randomization network are used to achieve an acceptably low routing error. Thus, the purpose of these feedback lines is to achieve an acceptably low routing error, not to resolve output contention. This switch is self-routing and requires minimal complexity in call set up control but has non-zero blocking probability. To achieve a reasonable cell loss probability (e.g., $10^{-6}$ or less), the switch utilization must be kept low. The output of the switch is partitioned into channel groups as a finction of the input probability. This implies that as the utilization of the switch changes, it is necessary to modify the partition to maintain the performance level.

P. Min, H. Saidi & M. V. Hedge, *A Nonblocking Architecture for Broadband Multichannel Switching*, IEEE ACM Trans. on Networking, vol. 3, no. 2, p. 181–198, April, 1995, discloses a multiple-channel switch based on the running-adders network and the Flip network. FIG. 7 shows the architectural design of this multiple-channel switch 70. The basic building block element for the multiple-channel switch includes a running-adder network 71 and a Flip network 72. The number of the basic building block elements required to construct the switch is determined by the number of channel groups. However, each building block element is uniform and connected in a cascaded fashion. As such, the network can be constructed from a single building element that is recursively used by introducing feedback lines and a single cell/packet buffer 73 (as shown in FIG. 7). Thus, the purpose of these feedback lines is to reduce hardware cost, not to resolve output contention. A concentrator network may also be employed in order to resolve output contention.

FIG. 8 shows a switch 75 disclosed in Tan Chaney, J. Fingerhut, Margaret Aucke and Jonathan Turner, Design of a Gigabit ATM Switch, Washington University, St. Louis, Technical Report WUCS-96-07. The switch fabric includes building blocks formed from six 8×8 Benes networks connected according to a shuffle pattern configuration. Input processor 77 receives cells, buffer the cells, and performs VP and VC translation as necessary to route cells to their proper output. Output processor 78 resequences cells received from the Benes network and queues the received cells pending transmission on the outgoing link. Feedback paths are provided between the output processes and the input processes for purposes of supporting multicast routing only. That is, as each cell is outputted from the switch, a copy or replica of the cell may be fed back to the input for routing to a different destination node of the collection of destination nodes in the multicast group of the cell. No mechanism is disclosed for resolving output contention.

All of these networks teach to use switch fabrics with a large number of switches per number of input ports or recursively reuse switches in a complex recursive fashion to route cells from input ports to desired output ports. Additionally, some networks do not provide a mechanism for resolving output contention.

BENES NETWORKS

As noted above, the Benes network can be used as a switch fabric architecture. The Benes network is a special case of a Clos network. FIG. 9 shows an 8×8 Benes network. The basic building block of a Benes network is a 2×2 β element that can only be set in a bar state or in a cross state. An N×N Benes network is built using two N/2×N/2 Benes networks with an additional rightmost input stage of β elements and an additional leftmost output stage of β elements. Each rightmost or leftmost stage of the Benes network has N/2 β elements. These β elements are interconnected with the two (upper and lower) N/2×N/2 Benes networks according to a perfect shuffle pattern. Thus, an N×N Benes network has $2 \log_2 N - 1$ stages with a total of $N \cdot \log_2 N - N/2$ β elements.

In routing a cell or cell bearing information signal from an input port to an output port, a routing tag, represented by 2n-1 bits ($r_{2n-2} r_{2n-3} \ldots r_0$), including one bit $r_i$ for each stage $2n-2 \leq i \leq 0$ is assigned to each signal. A given bit $r_i$ of the routing tag corresponding to the stage i is assigned the value 0 if the signal is to be routed to the uppermost output of the β element of stage i that receives that signal. Likewise, the bit $r_i$ is assigned the value 1 if the signal is to be routed to the lowermost output of the β element of the stage i that receives the signal.

Benes networks are categorized as the "rearrangeably non-blocking". This means that the switch states of the β elements can always be adjusted to create paths between any permutation of input ports and associated destination output ports (provided, of course, that there is no output contention). However, this also means that if the switch states of the elements are not wisely chosen, it is possible that not all paths can be established between a given permutation of input ports and associated destination output ports. FIG. 10 illustrates an example of a poor choice of routing tags for signals received at input ports #5 and #6. In FIG. 10, each β element in the $i^{th}$ stage of a path is controlled by bit $r_i$ of the routing tag assigned to the two signals received as inputs to that switch. Note that in stage 1, the second to the topmost β element cannot be placed into either a bar or cross state since $r_i$ for the signals received at both inputs port #5 and #6 is 1. This β element is said to be in the "conflict state."

Thus, Benes networks require few switches yet are rearrangeably nonblocking. Nevertheless, Benes networks are infrequently used in communications networks. The reason is that Benes networks are difficult to reconfigure into the nonblocking state for each set of input cell bearing signals (received at respective input ports) to be switched (to corresponding destination output ports associated with the destination nodes of the cells of the input signals) each switching cycle. Several conventional techniques have been suggested for reconfiguring Benes networks in an efficient manner.

D. Opferman & N. T. Tai-Wu, *On a Class of Rearrangeable Switching Networks: Part 1: Control Algorithm*, Bell Sys. Tech. J., p. 1579–1600, May 1971 discloses a looping process that realizes all permutations of input ports and respective destination output ports. According to the looping process, the switching states of the two outer stages are first set. Next, the switching states of the remaining stages are set recursively towards the center stage. The complexity of setting up the switching states is on the order of $O(N \cdot \log_2 N)$. To reduce the set up delay, a parallel computation is usually required. However, the time complexity of the parallel implementation does not provide much of an advantage over the basic looping process.

D. Nassimi & S. Sahni, *A Self-routing Benes Network and Parallel Permutation Algorithms*, IEEE Trans. on Computers., vol. C-30, no. 5, p 332–340, May 1981 teaches a self-routing process for "class F" permutations of input port numbers and destination output ports. D. Nassimi & S. Sahni, *Parallel Algorithms to Set Up the Benes Permutation Networks*, IEEE Trans. on Computers, Vol. C-31, no. 2, p. 148–154, February, 1982 teaches a fast parallel process for such class F permutations. C. Raghavendra & R. Boppana, *On Self-routing in Benes and Shuffle Exchange Networks*, IEEE Trans. on Computers, vol. 40, no. 9, p. 1057–1064, September, 1991 teaches a class of linear permutations that can be self-routed through a Benes network. However, each of these techniques only realizes a subset of all possible input port number and respective destination output port permutations.

K. Y. Lee, *A New Benes Network Control Algorithm*, IEEE Trans. on Computers, vol. C-36, no. 6, p. 768–772, June, 1987 proposes a process that is able to realize all permutations. Furthermore, T. Lee & S-Y Liew, Parallel Routing Algorithms in Benes-Clos Networks Infocom'96 proposes a process that recursively uses sorting and merging operations to determine the appropriate route through the switch fabric for each input. Nevertheless, the major drawbacks of these algorithms are that they either realize partial permutations or they involve highly complex algorithms for setting up the switching states.

L-S Chiang, *Faster Benes Network Algorithm*, Master Thesis, University of Pittsburgh (1993) teaches three different control algorithms referred to as the parallel looping algorithm (PLA), the centralized bit-controlled algorithm (CBCA) and the centralization algorithm (CA). The PLA is a modified looping algorithm that adopts concepts from a Waksman network as the first step to setting up the switching states. The CBCA and the CA are based on the observation that, if all the switching states in the center stage of a Benes network are determined, all other switching states can then be determined. Thus, these two algorithms first determine the switching states of the center stage and then work toward the outer stages. These algorithms have the advantage of using the exclusive-OR operation to determine the switching states of the outer switching stages. However, a bottleneck appears in determining the switching states in the center stage.

M-R Yang & R. Thompson have suggested a routing control theorem and a partially-self-routing algorithm for controlling Benes networks. Although the partially-self-routing algorithm has the advantages of only requiring the exclusive-OR operation and its verification, the implementation of the algorithm still involves complex determination of the control sequences in a routing tag.

It is an object of the present invention to overcome the disadvantages of the prior art.

SUMMARY OF THE INVENTION

This and other objects are achieved by the present invention. An illustrative environment of use of the invention is a communications network, such as a telephone network, cable television network or computer data network. Illustratively, the communication network communicates information in cells or packets according to the asynchronous transfer mode (ATM) communication protocol. Each node communicates the cells or packets to each other node in communication channels which can be virtual circuits (VCs) or virtual paths (VPS). At least one node employs a switch fabric with a Benes network for routing input cells onto the appropriate output channel for transmission to the next node on the path to the destination of the cell.

According to one embodiment, a method is provided for assigning routing tag bits for routing signals through a Benes network. Illustratively, the Benes network comprises an input stage and an output stage. The input and output stages each comprise a column of 2×2 β elements. Each signal inputted to the Benes network is associated with control sequence bits, including one control sequence bit for each particular control stage of the Benes network. Each 2×2 β element routes an inputted signal to an upper output if the control sequence bit is 0 and routes the inputted signal to a lower output if the control sequence bit is 1. For a particular Benes subnetwork having input stage β elements in a particular control stage of the Benes network, the following steps are performed. A 0 is assigned to a control sequence bit associated with a signal $q_0$ received at an upper input of a topmost input stage β element. A 1 is assigned to a control sequence bit associated with a signal $q_k$ received at the same output stage β element as the signal $q_0$. A 1 is assigned to a control sequence bit associated with a signal $q_1$ received at a lower input of the topmost input stage β element. A 0 to is assigned to a control sequence bit associated with a signal $q_k{'}$ received at the same output stage β element as the signal $q_1$. For at least one signal $q_p$ for which no control sequence bit is yet assigned, either a 0 or a 1 is assigned to the control sequence bit associated with the signal $q_p$. The complement of this control sequence bit chosen for the signal $q_p$ is assigned to a control sequence bit associated with a signal $q_{k''}$ received at the same output stage β element as the signal $q_p$.

Illustratively, this process is repeated for each Benes subnetwork having input stage β elements in each control stage. Thereafter, the destination output port of each signal, as represented in binary form, is appended to the end of each control sequence thus determined for each respective signal. This forms the routing tag for routing the signal through the Benes network.

According to another embodiment, a method is provided for routing received cells through a switch fabric. A plurality of output channels are organized into a plurality of channel groups, wherein each of the channels groups is associated with one or more unique output ports of a Benes network. A plurality of cells destined to one or more of the plurality of channel groups is received at plural input queues. A different output port of the Benes network is selected for one or more of the input queues that contains a cell. Then, one cell is switched from each of one or more input queues through the Benes network to the respective selected output port.

Illustratively, the selection of output ports is performed for each input in a specific predetermined order. Only an output port not yet selected by another input queue, associated with a channel group to which a cell to outputted from the queue is destined, may be selected, if such an output is available. Otherwise, if each output associated with the destination channel group has been selected by preceding input queues, an idle output of the Benes network of a channel group containing more channels than cells, to be outputted from the input queues, is selected.

Illustratively, when an idle, i.e., incorrect output port is selected, such purposely "wrongly" routed cells are fed back to the head of the input queues for re-routing.

DETAILED DESCRIPTION OF THE INVENTION

For sake of clarity, the detailed description is divided into two sections describing a Benes network according to the present invention and an ATM switch architecture according to the present invention.

ENHANCED PARTIALLY SELF-ROUTING PROCESS FOR BENES NETWORK

Let an N×N Benes network be viewed as the concatenation of two subnetworks, namely, a control subnetwork, and a self-routing subnetwork. The control subnetwork contains the first $m=(\log_2 N-1)$ stages of the Benes network, and the self-routing subnetwork contains the remaining $n=\log_2 N$ stages.

Definition 1: A control sequence is a binary sequence of length m (i.e., $\log_2 N-1$) bits $c_{m-1} c_{m-2} \ldots c_0$.

Definition 2: A control set, C, is a set that contains all $2^{n-1}=N/2$ possible combinatorial arrangements of the control sequences.

Definition 3: A routing tag $R=(c_{m-1}c_{m-2} \ldots c_0 d_{n-1}d_{n-2} \ldots d_0)=(r_{2n-2}r_{2n-3} \ldots r_0)$ is a binary that consists of a control sequence $(c_{m-1}c_{m-2} \ldots c_0)$ and the binary representation of an output port address $(d_{n-1}d_{n-2} \ldots d_0)$.

Definition 4: A β element is said to be in a conflict switching state (or a conflict state) when the switching state of the β element can not be set to a bar or to a cross state.

Figure 1:
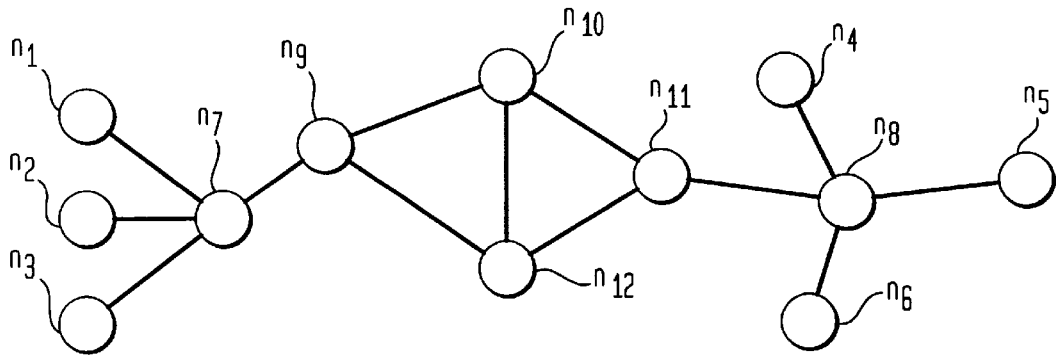
FIG. 1 shows a conventional ATM communications network.
Figure 2:
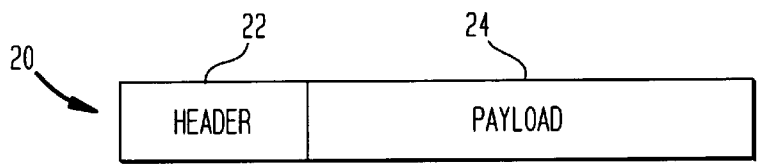
FIG. 2 shows a conventional cell.
Figure 3:
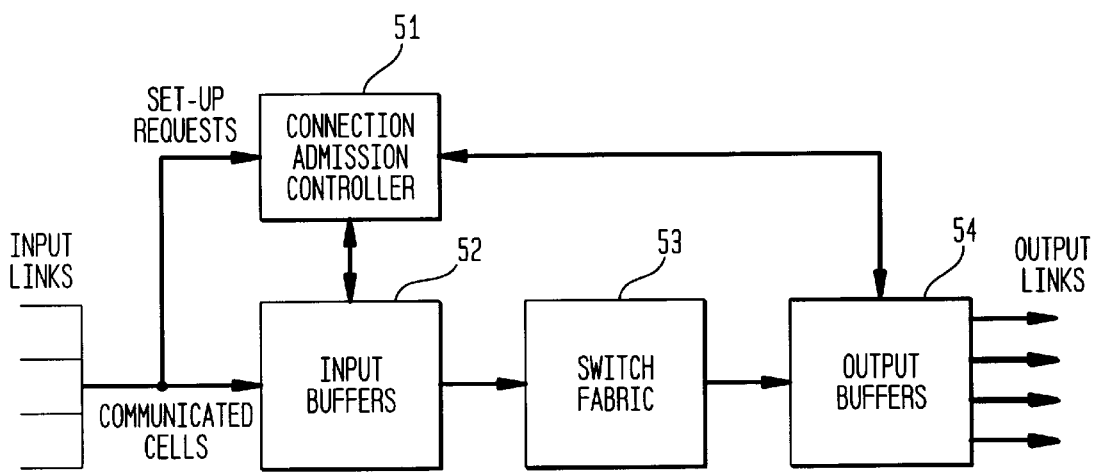
FIG. 3 shows a conventional node architecture.
Figure 4:
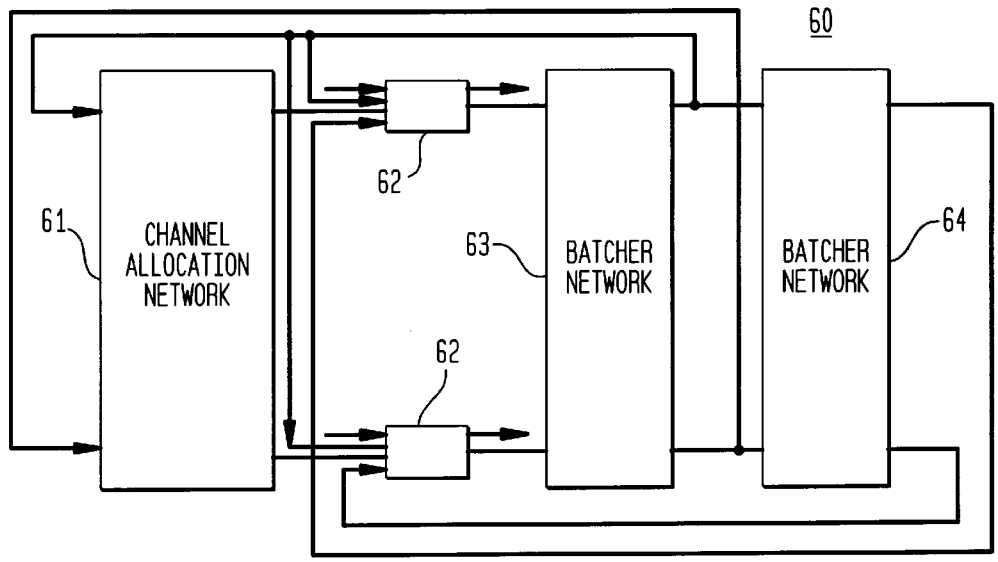
FIG. 4 shows a conventional multiple channel switch.
Figure 5:
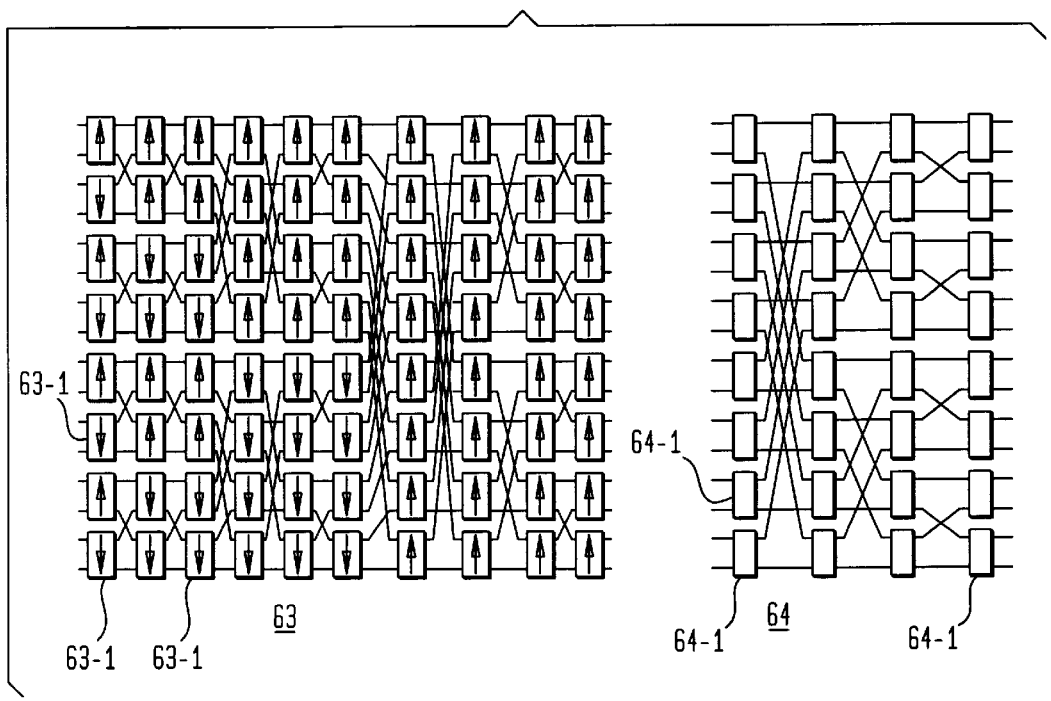
FIG. 5 shows conventional Batcher and Banyan networks.
Figure 6:
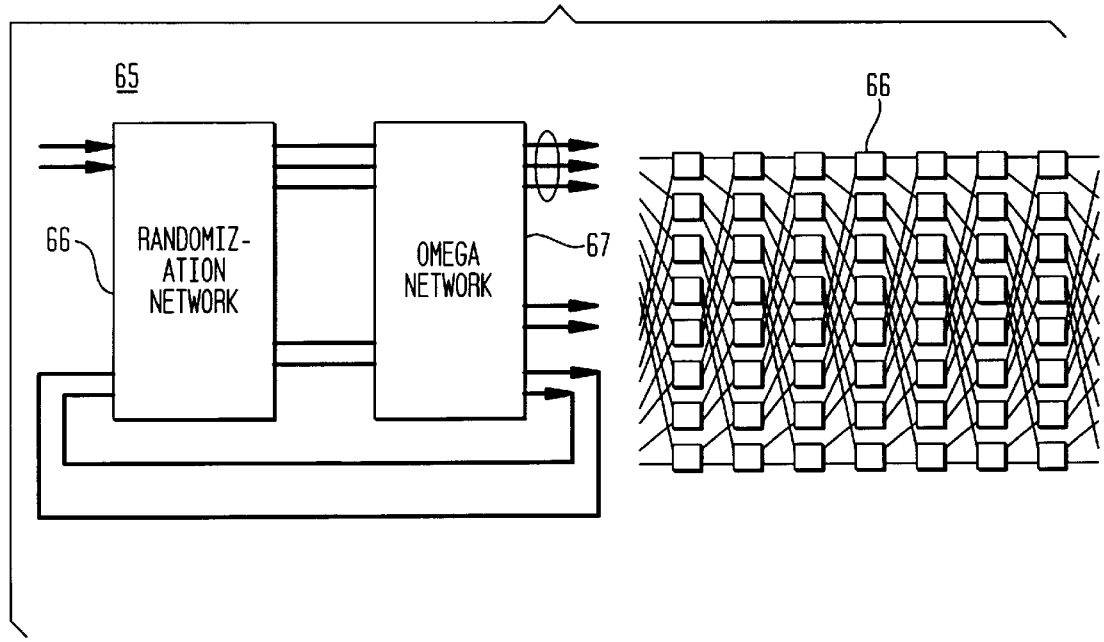
FIG. 6 shows a conventional switch with omega and randomization networks.
Figure 7:
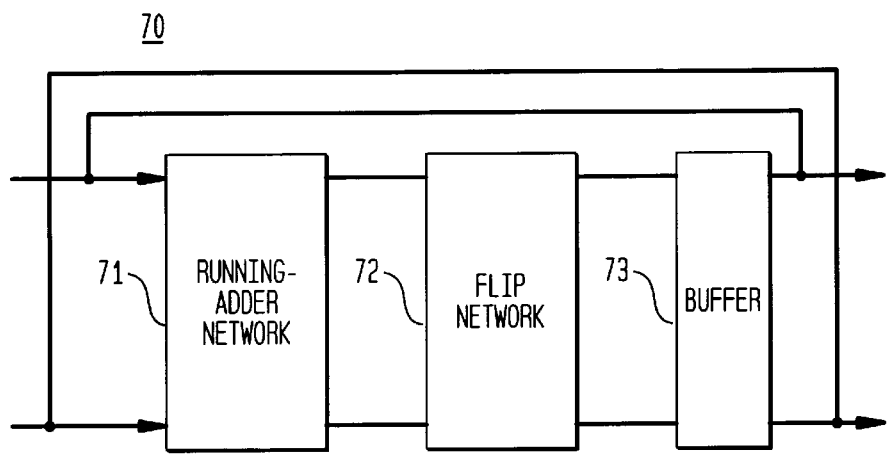
FIG. 7 shows a conventional multiple channel switch with running adder and flip networks.
Figure 8:
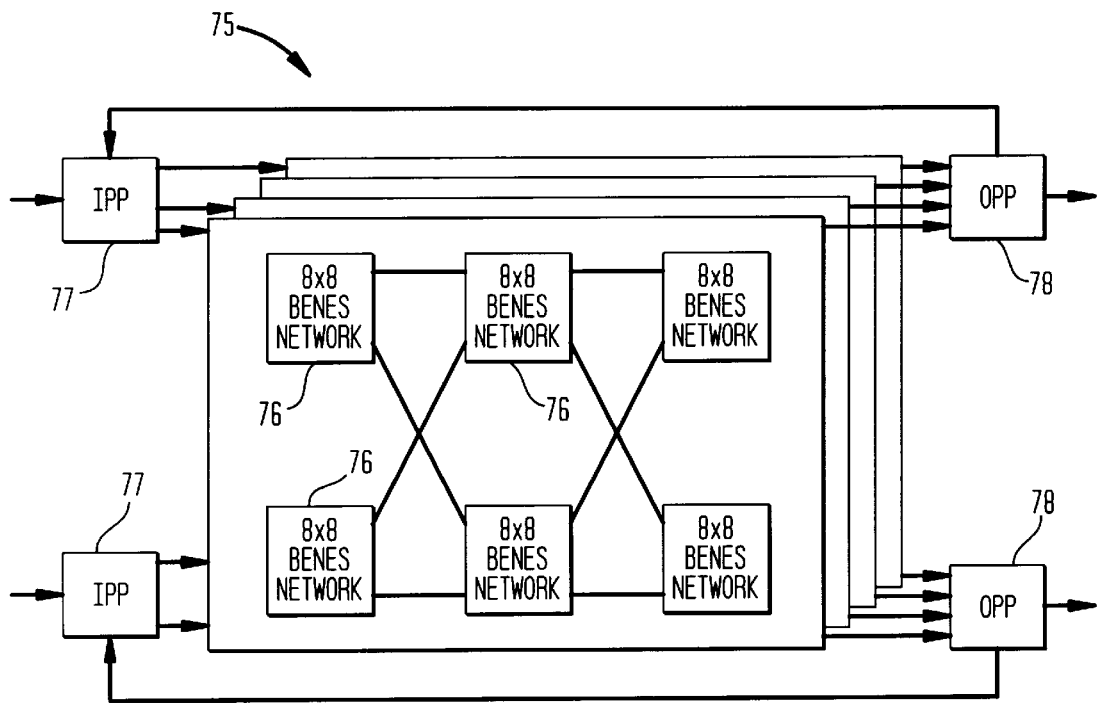
FIG. 8 shows a conventional switch with Benes networks for performing multicast routing.
Figure 10:
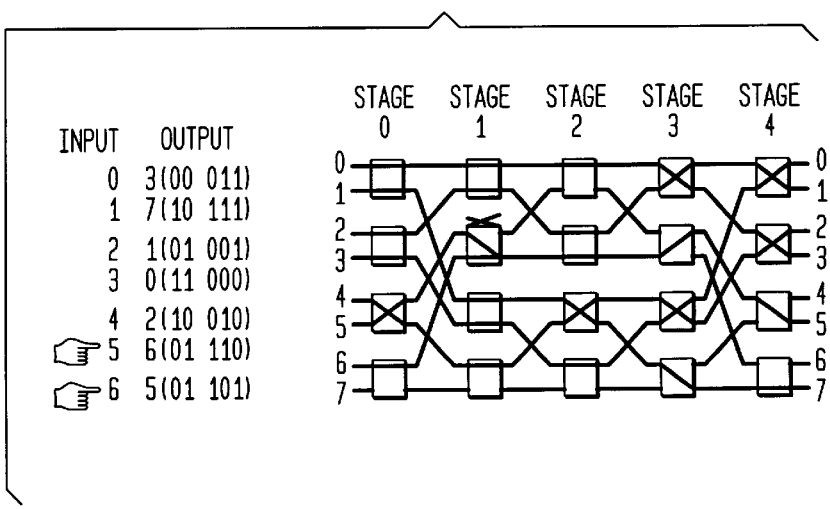
FIG. 10 shows a conventional poor choice of routing tags in a Benes network.
Figure 9:
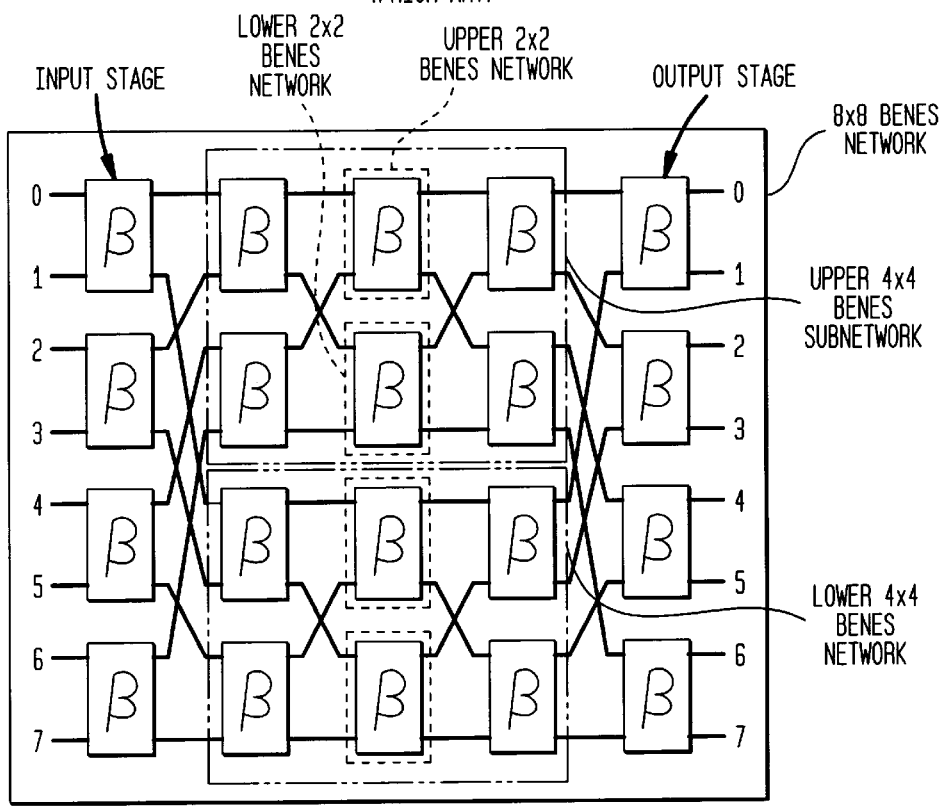
FIG. 9 shows a conventional Benes network switch fabric.
Figure 11:
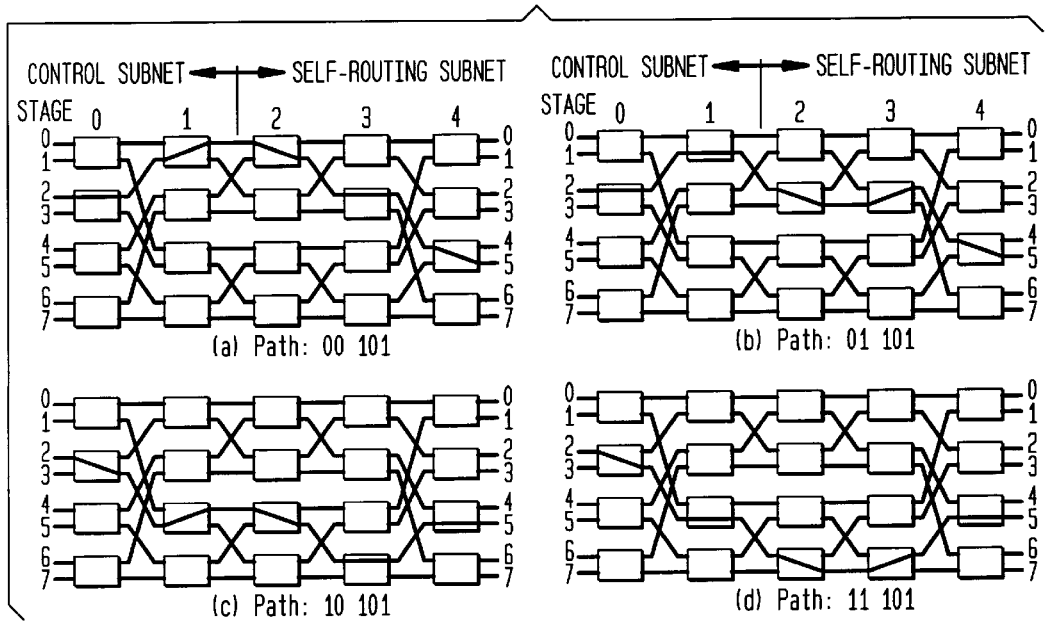
FIG. 11 shows a Benes network switch fabric according to an embodiment of the present invention.

Let the stages of an N×N Benes network be labeled 0 to 2n−2 from the leftmost stage of the control subnetwork to the rightmost stage of the self-routing subnetwork. This is shown in FIG. 11 for an 8×8 Benes network, wherein the control network has m=2 stages and the self-routing network has n=3 stages. The stages 0 and 1 belong to the control subnetwork, and stages 2, 3, and 4 belong to the self-routing subnetwork.

The β element in the $i^{th}$ stage of a path is controlled by bit $r_i$ of the routing tags of the two signals received at that β element. If $r_i=0$, the β element routes the (cell bearing) signal to the upper output terminal. Otherwise if $r_i$32 1, the (cell bearing) signal is routed to the lower output terminal. Suppose that the signal inputted at input port #2 must be routed to output port #5, where $d_2 d_1 d_0=101$. The four possible switch paths are shown. Each switch path has a different control sequence $c_1 c_0$, namely, 00, 01, 10 or 11. Note that the destination address binary sequence $d_2 d_1 d_0=101$ is simply appended to the control sequence for use in routing the signal through self-routing stages 2, 3 and 4. The routing tag for these four paths are: 00101, 01101, 10101, 11101.

Consider now that an N×N Benes network is in fact constructed from an upper N/2×N/2 Benes network and a lower N/2×N/2 Benes network interconnected by an additional (leftmost) input stage according to a perfect shuffle pattern and to an additional (rightmost) output stage according to an inverse perfect shuffle pattern. The signals received at up to half of the input ports will be routed to output ports of the upper half (output ports #0,1, ..., N/2−1) of output ports and the remaining signals will be routed to output ports of the lower half (output ports #N/2+1, N/2+2, ..., N−1). Moreover, switch paths leading to the upper N/2×N/2 Benes subnetwork will be outputted to different β elements of the output (rightmost) stage of the N×N Benes network. The same is true for the signals routed to the lower N/2×N/2 Benes subnetwork. As such, Benes networks have the following additional two properties:

PROPERTY 1: In any control stage, the two signals inputted to the same β element must be outputted to different attached (lower and upper) Benes subnetworks.

That is, stage 0 is connected to lower and upper N/2×N/2 Benes subnetworks. If two signals are switched by the same β element of stage 0, then one signal must be outputted to the lower Benes subnetwork and one signal must be outputted to the upper Benes subnetwork. Note that this property results from the perfect shuffle attachment of the input stage to the attached Benes subnetworks.

PROPERTY 2: In any control stage, inputted signals that are routed to the same attached (lower or upper) Benes subnetwork must be routed to different β elements in an output stage to which that Benes subnetwork is connected.

Again, this results from the inverse perfect shuffle attachment of the Benes subnetworks to their output stage in forming the larger Benes network.

In accordance with these properties and theorems, the following process may be executed to set up the control sequences for each inputted signal for controlling routing of these signals in the control stage. The routing of each signal is then controlled in the self-routing stage using the binary representation of the destination address of each signal. The process iterates over each control stage from stage $\delta=0$ to stage $\delta=m-1$. Each control stage contains a total of $N/2$ $\beta$ elements which are divided into one or more Benes subnetworks, depending on the control stage. That is, stage 0 includes $N$ input $N/2$ $\beta$ elements for one $N \times N$ Benes network. Stage 1 includes $N/4$ $\beta$ elements for each of two $N/2 \times N/2$ Benes subnetworks, etc. In general, at a stage $\delta$, the $\beta$ elements are divided into $2^\delta$ Benes subnetworks which each have $N/2^{\delta+1}$ $\beta$ elements. Each Benes subnetwork includes $\beta$ elements in only a total of $2(n-\delta)-1$ stages, e.g., the $N \times N$ Benes network includes $\beta$ elements in all stages $0 \ldots 2n-2$, the $N/2 \times N/2$ Benes subnetworks include $\beta$ elements in only stages $1 \ldots 2n-3$, etc. The control sequence bits are furthermore set on a Benes subnetwork by Benes subnetwork basis for each iterated stage. In so iterating, each signal is "mapped" to a respective input port number and destination output port number relative to the Benes subnetwork to which it is inputted. This is described in greater detail below in reference to an example.

The basic process is as follows:

```
for δ = 0 to m − 1
/* iterate over all control or input stages */
begin
        for each Benes subnetwork having an input β element in stage δ
        /* in each iterated control stage, iterate over each Benes subnetwork into which the
           β elements of the iterated control stage is divided */
        begin
            identify signal q₀ received at input port #0 of the currently iterated Benes
                subnetwork;
            assign c^q0_{m−δ−1} = 0;
            /* identify the signal received at the upper input of the topmost β element
               of the currently iterated Benes subnetwork; assign the control sequence
               bit for this signal to 0 thereby routing it to the upper attached Benes
               subnetwork */
            identify signal q_k destined to d^q0_{n−1} d^q0_{n−2} ... d^q0_δ;
            assign c^qk_{m−δ−1} = 1;
            /* identify the signal q_k that is routed by the same output β element of the
               currently iterated Benes subnetwork as q₀ and assign the control
               sequence bit for this signal to 1 so as to route signal q_k to the lower
               attached Benes subnetwork */
            identify signal q₁ received at input port #1 of the currently iterated Benes
                subnetwork;
            assign c^q_{m−δ−1} = 1;
            /* identify the signal received at the lower input of the topmost β element
               of the currently iterated Benes subnetwork; assign the control sequence
               bit for this signal to 1 thereby routing it to the lower attached Benes
               subnetwork */
            identify signal q_k' destined to d^q1_{n−1} d^q1_{n−2} ... d^q1_δ;
            assign c^qk'_{m−δ−1} = 0;
            /* identify the signal q_k' that is routed by the same output β element of the
               currently iterated Benes subnetwork as q₁ and assign the control
               sequence bit for this signal to 0 so as to route signal q_k' to the upper
               attached Benes subnetwork */ for p = 2 to  N / 2^{δ+1}

/* for each input port of the currently iterated Benes subnetwork receiving
               a signal not assigned a control sequence bit in the previous steps */
            begin
                identify q_p
                if c^qp_{m−δ−1} is not yet assigned then
                begin
                        identify signal q_k'' destined to d^qp_{n−1} d^qp_{n−2} ... d^qp_δ;
                        if d^qp_{n−1} = d^q1_{n−1} and
                        for each Ψ such that c^qΨ_{m−δ−1} = 0
                              |d^qp_{n−1} d^qp_{n−2} ... d^qp_{δ+1} d^qp_δ − d^qΨ_{n−1} d^qΨ_{n−2} ... d^qΨ_{δ+1} d^qΨ_δ| ≥ 0
                        assign c^qp_{m−δ−1} = 1 if and only if c^qk'_{m−δ−1} can be set equal to 0
                        /* ensure that signal q_p is routed to the upper attached Benes
                           subnetwork if any signal q_Ψ previously assigned a control
                           sequence bit satisfies the above condition */
                        else
                            assign c^qp_{m−δ−1} = 0 or 1;
                            /* otherwise, the control sequence bit for signal q_p
                               may be freely chosen */
                        assign c^qk''_{m−δ−1} = c^qp_{m−δ−1};
                        /* assign the control sequence bit for the signal q_k'' to
                           be the complement of the control sequence bit assigned
                           for the signal q_p thereby routing signal q_k'' to the
```

```
                opposite output port of its β element (and opposite
                attached Benes subnetwork) as that of signal q_p */
         end
      end
   end
end
```

Briefly, the process is described as follows. Assume first that each signal is labeled with the same number assigned to the input port of the N×N Benes network at which the signal is originally received. The step "for δ=0 to m−1" causes the process to iterate over each control stage in the order δ=0 to δ=m−1. As noted above, in a given stage δ, the β elements are the input β elements of one or more Benes subnetworks. The process is iterated over each Benes subnetwork having an input β element in the current iterated stage δ. The signal $q_0$ received at the input port #0 of the currently iterated Benes network is identified. Initially, where δ=0, $q_0=0^{th}$ signal. For later stages, $q_0$ can be determined by mapping signals from the previous stage according to the switching state of the β elements, as dictated by the control sequence bits of the signals for the previous stage, and the predetermined perfect shuffle interconnection of the previous stage to the currently iterated stage. Once identified, $c^{q_0}_{m-\delta-1}$ is set to 0. This causes the signal $q_0$ to be switched by the β element of the stage δ that receives it to the upper output of the β element. As such, the signal $q_0$ is routed to the upper Benes "sub-subnetwork" attached to the input stage β element, of the currently iterated Benes subnetwork, that switches $q_0$. This step is performed as per the Waksman set up criterion.

Next, the step "identify signal $q_k$ destined to $d^{q_0}_{n-1}d^{q_0}_{n-2} \cdots \overline{d^{q_0}_\delta};$" identifies the signal $q_k$ that is to be switched by the same output stage β element of the currently iterated Benes network as $q_0$. The control sequence bit $c^{q_k}_{m-\delta-1}$ corresponding to this $q_k^{th}$ signal for the currently iterated stage δ is set to 1. This causes the signal $q_k$ to be routed to the lower output of the β element that receives it. As such, the signal $q_k$ is routed to the lower Benes "sub-subnetwork" attached to the input stage β element, of the currently iterated Benes subnetwork, that switches $q_k$. This step ensures that property 2 is satisfied in regard to signals qo and $q_k$.

Next, the signal $q_1$ is identified which is received at the input port #1 of the currently iterated Benes subnetwork. Again, for stage δ=0, this is the $q_1$=1st signal. As with $q_0$, $q_1$ can be determined for later stages δ by mapping the signals from the previous stage according to the switching state of the β elements of the previous stage, as dictated by the control sequence bits of the previous stage, and the perfect shuffle interconnection of the previous stage to the currently iterated stage. The control sequence bit for the currently iterated stage δ corresponding to the $q_1^{th}$ signal $c^{q_0}_{m-\delta-1}$ is assigned the value 1. This causes the input stage β element of the currently iterated Benes subnetwork to switch the signal $q_1$ to the lower output. As such, the signal $q_1$ is routed to the lower Benes network attached to the input stage element that switches signal $q_1$. This step ensures that property 1 is satisfied in regard to signals $q_0$ and $q_1$.

Next, the step "identify signal $q_{k'}$ destined to $d^{q_1}_{n-1}d^{q_1}_{n-2} \cdots \overline{d^{q_1}_\delta};$" identifies the signal $q_{k'}$ that is to be switched by the same output stage β element of the currently iterated Benes network as $q_1$. The control sequence bit $c^{q_k'}_{m-\delta-1}$ corresponding to this $q_{k'}^{th}$ signal for the currently iterated stage δ is set to 0. This causes the signal $q_{k'}$ to be routed to the upper output of the input stage β element, of the currently iterated Benes subnetwork, that receives it. As such, the signal $q_{k'}$ is routed to the upper Benes "sub-subnetwork" attached to the input stage β element that switches $q_{k'}$. This ensures that property 2 is satisfied in regard to signals $q_1$ and $q_{k'}$.

The step $$\text{"for } p = 2 \text{ to } \frac{N}{2^{\delta+1}} \text{"}$$

causes the process to iterate over the remaining signals $q_p$ received at input ports # p of the currently iterated Benes subnetwork for which no control sequence bit has yet been assigned. First, the signal $q_{k''}$ destined to the same output stage β element (in the output stage of the current Benes subnetwork) as $q_p$ is identified. A check is performed to determine whether or not a bit value has been assigned for the currently iterated stage δ to the signal $q_p$. If not, then a value is assigned to the control sequence bit depending on the evaluation of the condition:

if $d^{q_p}_{n-1} = d^{q_1}_{n-1}$ and for each Ψ such that $c^{q_\Psi}_{m-\delta-1} = 0$ $$\left| d^{q_p}_{n-1} d^{q_p}_{n-2} \cdots d^{q_p}_{\delta+1} d^{q_p}_\delta - d^{q_\Psi}_{n-1} d^{q_\Psi}_{n-2} \cdots d^{q_\Psi}_{\delta+1} \overline{d^{q_\Psi}_\delta} \right| \geq 0$$

If this condition is true, then $q_{k''}$ will be routed to the lower attached Benes subnetwork and the control sequence bit $c^{q_p}_{m-\delta-1}$ for the stage δ corresponding to the signal $q_p$ is set to 0. This causes the β element in stage δ that receives the signal $q_p$ to switch the signal $q_p$ to the upper output. As such, the β element routes the signal $q_p$ to the upper Benes "sub-subnetwork" attached to the input stage β element that switches $q_p$ in stage δ. On the other hand, if the condition is not true, the control sequence bit $c^{q_p}_{m-\delta-1}$ for the stage δ corresponding to the signal $q_p$ may be set to either 0 or 1.

The purpose of the condition test is to ensure that signal $q_p$ is not routed to the same attached subnetwork as any signal $q_\Psi$ previously assigned for routing if the signal $q_\Psi$ is to be routed by the same output stage β element as $q_p$ (i.e., if $q_\Psi=q_{k''}$). If no such $q_\Psi$ exits (i.e., $q_{k''}$ is not yet assigned a routing bit for this stage) then $q_p$ can be freely assigned to either the upper or lower attached Benes subnetwork. A close inspection of this routing process reveals that whenever a routing tag bit $c^q_{m-\delta-1}$ (corresponding to stage δ) is assigned for a particular signal q, a routing tag bit $c^{q'}_{m-\delta-1}$ (corresponding to stage δ) is also assigned for the signal q' that is routed by the same output stage β element (of stage m−δ−1, the output stage of the Benes subnetwork having stage δ as an input stage) as q. Thus, when this process step is reached, for any given $q_p$, no routing tag bits have been assigned for either $q_p$ or $q_{k''}$. As such, no signal $q_\Psi$ can exist that causes the condition to be true. Accordingly, the check for this condition can be omitted; if $c^{q_p}_{m-\delta-1}$ is not assigned then this control sequence bit may be freely assigned to 0 or 1 thereby routing signal $q_p$ to the upper or lower attached Benes subnetwork.

In the next step, the control sequence bit $c^{q_k}_{m-\delta-1}$ is set equal to the complement of the value recently set for the control sequence bit $c^{q_p}_{m-\delta-1}$, namely, $\overline{c^{q_p}_{m-\delta-1}}$. As such, the signal $q_{k''}$ is switched to the opposite output of the input stage β element (of the currently iterated Benes subnetwork), and thus the opposite Benes "sub-subnetwork" attached to the currently iterated Benes network, as the signal $q_p$. This ensures that both $c^{q_p}_{m-\delta-1}$ and $c^{q_{p'}}_{m-\delta-1}$ satisfy property 2.

To illustrate the process, an example is now described with reference to FIGS. 12–19. Assume that N=8, n=3 and m=2. Eight signals are received to be switched from the input ports #0–7 to the output ports # 0–7 of the 8×8 Benes network as follows:

$$\left(\frac{\text{input}}{\text{output}}\right) = \begin{pmatrix} 0 & 1 & 2 & 3 & 4 & 5 & 6 & 7 \\ 3 & 7 & 1 & 0 & 2 & 6 & 5 & 4 \end{pmatrix}.$$

Figure 12:
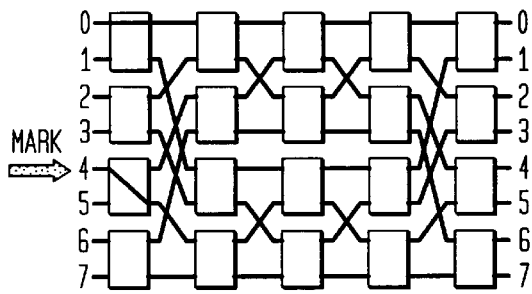
FIGS. 12–19 illustrate a process for assigning control sequence tag bits in routing cell bearing signals through the Benes network of FIG. 11, according to an embodiment of the present invention.

On the first iteration over stages, δ=0 and only one Benes subnetwork, namely, the 8×8 Benes network, has input β elements in the stage δ=0. First, the control sequence bit $c_0^1$, corresponding to the signal $q_0=0$, is set to 0. As such, the topmost β element in stage δ=0 switches the signal received on input port #0 of the 8×8 Benes network to the upper output port connected to the upper attached 4×4 Benes subnetwork, as shown in FIG. 12. The signal 0 is destined to output port # 3, represented in binary as $d^0_2 d^0_1 d^0_0 = 011$. The signal $q_k$ destined to $d^0_2 d^0_1 d^0_0 = '010'$ or 2 is identified. As shown, the input signal $q_k=4$ is destined to output port #2. The control sequence bit $c^4$ corresponding to this $4^{th}$ signal is set equal to 1. As shown in FIG. 12, this causes the second to bottommost β element to route the $4^{th}$ signal to the lower output port and therefore to the lower attached 4×4 Benes subnetwork.

Figure 13:
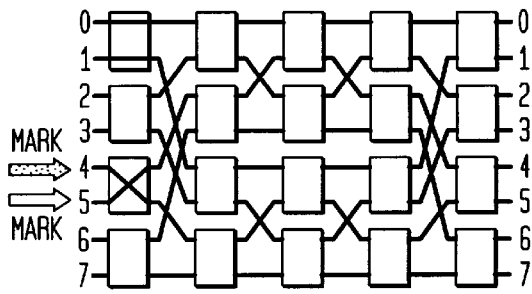

Next, the control bit $c^1_1$ associated with the input signal $q_1=1$ is set to 1. As shown in FIG. 13, this causes the topmost β element to route the 1st signal to the lower output port and therefore to the lower attached 4×4 Benes subnetwork. The input signal $q_1=1$ is destined to the destination 7, represented in binary as $d^1_2 d^1_1 d^1_0 = '111'$. The signal $q_k$ destined to $d^1_2 d^1_1 d^1_0 = '110'$ or 6 is identified. As shown in FIG. 13, the $q_{k'}=5^{th}$ signal is destined to the output port #6. The control sequence bit $c^5_1$ corresponding to the $5^{th}$ signal is set equal to 0. Thus, as shown in FIG. 13, the second to bottommost β element receiving the 5th signal is switched to the uppermost output and therefore to the upper attached 4×4 Benes subnetwork.

The control sequence bits for stage δ=0 associated with the signals input on input ports p=2 to 7 are then examined. The control sequence bit for the $q_2$ signal received at input port #2 is not yet set. The $q_2=2^{nd}$ signal is destined to output port #1, represented in binary as $d^2_2 d^2_1 d^2_0 = '001'$. The signal $q_{k''}$ destined to $d^2_2 d^2_1 d^2_0 = '000'$ is identified. This is the $q_{k''}=3^{rd}$ signal.

Next, a determination is made for setting the control sequence bit $c^2_1$ of the $q_2=2^{nd}$ signal. Since, as noted above, the condition:

if $d^{q_p}_{n-1} = d^{q_1}_{n-1}$ and for each Ψ such that $c^{q_\Psi}_{m-\delta-1} = 0$ $$\left| d^{q_p}_{n-1} d^{q_p}_{n-2} \cdots d^{q_p}_{\delta+1} d^{q_p}_\delta - d^{q_\Psi}_{n-1} d^{q_\Psi}_{n-2} \cdots d^{q_\Psi}_{\delta+1} \overline{d^{q_\Psi}_\delta} \right| \geq 0$$

cannot be true, the control sequence bit $c^2_1$ can be freely set to either 1 or 0. As shown, the control sequence bit $c^2_1$ corresponding to the $q_2=2^{nd}$ signal illustratively is set to 0 thereby routing the 2nd signal to the upper attached Benes subnetwork.

Figure 14:
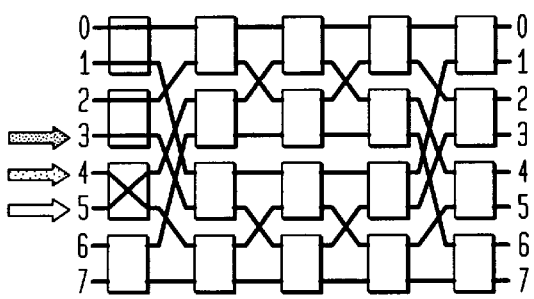

The control sequence bit $c^3_1$ corresponding to the $3^{rd}$ signal is set to the complement of the control sequence bit $c^2_1$, or to 1. As shown in FIG. 14, the second to topmost β element in stage δ=0 routes the $2^{nd}$ signal to the upper output (and thus the upper attached 4×4 Benes subnetwork) and routes the $3^{rd}$ signal to the lower output (and thus to the lower attached 4×4 Benes subnetwork).

In continuing to iterate p=3,4 and 5, note that a control sequence bit was previously set for the $3^{rd}$, $4^{th}$ and $5^{th}$ signals, respectively, received on these input ports. Therefore, no additional processing is performed on the control sequence bits of the signals received on input ports #3,4 or 5. Iteration continues with p=6. The control sequence bit for the $q_6^{th}$ signal received at input port #6 is not yet set. The $q_6=6^{th}$ signal is destined to output port #5, represented in binary as $d^6_2 d^6_1 d^6_0 = '101'$. The signal $q_{k''}$ destined to $d^6_2 d^6_1 \overline{d^6_0} = '100'$ is identified. This is the $q_{k''}=7^{th}$ signal.

Next, a determination is made regarding to which value to set control sequence bit $c^6_1$ for the $q_6=6^{th}$ signal. As noted above, the condition if $d^{q_p}_{n-1} = d^{q_1}_{n-1}$ and for each Ψ such that $c^{q_\Psi}_{m-\delta-1} = 0$ $$\left| d^{q_p}_{n-1} d^{q_p}_{n-2} \cdots d^{q_p}_{\delta+1} d^{q_p}_\delta - d^{q_\Psi}_{n-1} d^{q_\Psi}_{n-2} \cdots d^{q_\Psi}_{\delta+1} \overline{d^{q_\Psi}_\delta} \right| \geq 0$$

can never be true. Therefore, the control sequence bit $c^6_1$ can be freely chosen as either 1 or 0 (so as to route the signal $q_6$ to the upper or lower attached 4×4 Benes subnetwork). Illustratively, the control sequence bit $c^6_1$ is set to 0 so as to route the $q_6=6^{th}$ signal to the upper output of the input stage β element that receives it and therefore to the upper attached 4×4 Benes subnetwork.

Figure 15:
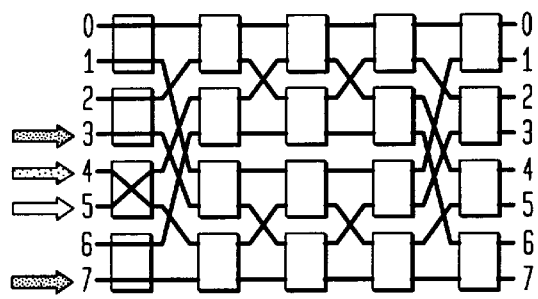

The control sequence bit $c^7_1$ corresponding to $7^{th}$ signal is set equal to the complement of $c^6_1$ or 1. As shown in FIG. 15, the bottommost β element is set to the bar state so as to switch the $6^{th}$ signal to the upper output (and therefore to the upper attached 4×4 Benes subnetwork) and to switch the $7^{th}$ signal to the lower output (and therefore to the lower attached 4×4 Benes subnetwork). This completes the iteration on the 8×8 Benes network and the stage δ=0.

On the next iteration over stages, δ is set to 1. There are two Benes subnetworks that have input β elements in the stage δ=1, namely, the upper 4×4 Benes network and the lower 4×4 Benes network. The $0^{th}$, $2^{nd}$, $5^{th}$ and $6^{th}$ signals originally inputted to input ports #0, 2, 5 and 6 of the 8×8 Benes network are received at input ports #0, 1, 2, 3 of the upper 4×4 Benes subnetwork by virtue of the control sequence bits $c^0_1$, $c^2_1$, $c^5_1$ and $c^6_1$ and the perfect shuffle interconnection of the input stage of the 8×8 Benes network to the upper attached 4×4 Benes subnetwork. Stated another way, $q_0=0^{th}$ signal, $q_1=2^{nd}$ signal, $q_2=5^{th}$ signal and $q_3=6^{th}$ signal for this iteration on the upper 4×4 Benes subnetwork. This provides the mapping of signals to input ports of the upper 4×4 Benes subnetwork. Likewise, by truncating the δ least significant bits of the destination output ports numbers of each of these signals, the transformed output port with respect to the upper attached 4×4 Benes subnetwork is produced. The transformation is thus.

$$\left(\frac{8 \times 8 \text{ input}}{8 \times 8 \text{ output}}\right) \rightarrow \left(\frac{\text{upper } 4 \times 4 \text{ input}}{\text{upper } 4 \times 4 \text{ output}}\right) = \begin{pmatrix} 0 & 2 & 5 & 6 \\ 3 & 1 & 5 & 6 \end{pmatrix} \rightarrow \begin{pmatrix} 0 & 1 & 2 & 3 \\ 1 & 0 & 3 & 2 \end{pmatrix}.$$

Beginning with the upper Benes subnetwork, the control sequence bit for the stage δ=1 corresponding to the $q_0=0^{th}$ signal inputted on the input port #0 of the currently iterated upper 4×4 Benes subnetwork is set to 0. The destination output port of this input signal relative to the upper 4×4 Benes subnetwork is $d^0{}_2\overline{d^0{}_1}$='01'. The $q_k=2^{nd}$ signal is identified as destined to be outputted from the output port # $d^0{}_2\overline{d^0{}_1}$='00'. The control sequence bit $c^2{}_0$ is therefore set to 1.

Figure 16:
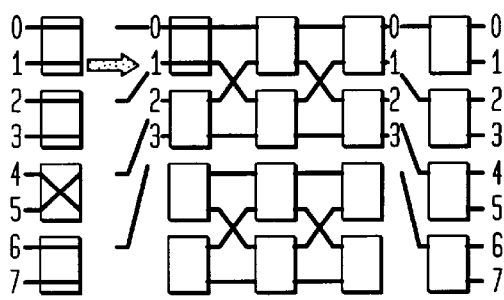

Likewise, the steps for assigning the control sequence bit for the $q_1=2^{nd}$ signal inputted on input port #1 of the upper 4×4 Benes subnetwork is set to 1 and the signal $q_{k'}$ is set to 0. However, in this case, the control sequence bits $c^2{}_0 c^1{}_0$ have already been set in the previous steps. Thus, these next two assignment steps can be skipped. As shown in FIG. 16, in accordance with $c^0{}_0=0$ and $c^2{}_0=1$, the topmost β element of stage δ=1 is set to the bar state.

Figure 17:
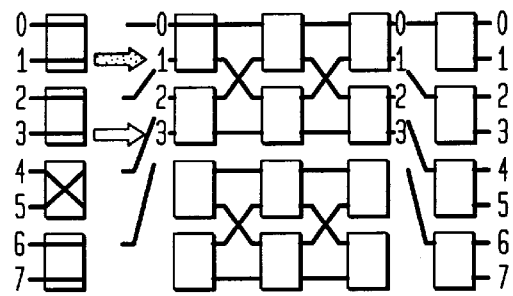

Processing is then performed on the signal inputted on input port # p=3 of the upper Benes subnetwork. The $q_3=5^{th}$ signal inputted on input #3 of the upper 4×4 Benes subnetwork is destined to the output port #3 of the 4×4 upper Benes subnetwork. The signal $q_{k''}=6$ is identified as the signal destined to output port # $d^5{}_2\overline{d^5{}_1}$='10'=2 of the upper 4×4 Benes subnetwork. The control sequence bit $c^{q_3=5}{}_0$ of the $q_3=5^{th}$ signal may be freely assigned to 0 or 1. Illustratively, the sequence bit $c^5{}_0$ corresponding to the $5^{th}$ signal for stage δ=0 is set to 0. Furthermore, $c^6{}_0$ is set to the complement of $c^5{}_0$=0 or 1. This completes the iterations on the upper 4×4 Benes subnetwork. As shown in FIG. 17, the second to topmost β element of stage δ=1 is set to the bar state in accordance with $c^5{}_0=0$ and $C^6{}_0=1$.

The process then iterates on the lower 4×4 Benes subnetwork. The $1^{st}$, $3^{rd}$, $4^{th}$ and $7^{th}$ signals are received at the input ports #0, 1, 2 and 3, respectively, of the lower 4×4 Benes subnetwork. Thus, the mapping of input ports and output ports is as follows:

$$\left(\frac{8\times 8\ \text{input}}{8\times 8\ \text{output}}\right) \rightarrow \left(\frac{\text{upper}\ 4\times 4\ \text{input}}{\text{upper}\ 4\times 4\ \text{output}}\right) = \left(\begin{array}{cccc}1 & 3 & 4 & 7\\7 & 0 & 2 & 4\end{array}\right) \rightarrow \left(\begin{array}{cccc}0 & 1 & 2 & 3\\3 & 0 & 1 & 2\end{array}\right).$$

Figure 18:
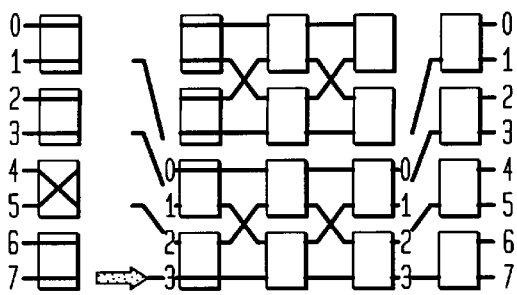

The control sequence bit $c^1{}_0$ corresponding to the $q_0=1^{st}$ signal inputted on input port #0 of the lower 4×4 Benes subnetwork is set to 0. The signal $q_k=7$ is identified which destined to output port # $d^1{}_2\overline{d^1{}_1}$='10'=2. The control sequence bit $c^7{}_0$ is therefore set to 1. In FIG. 18, the switch states of the second to bottommost and bottommost switches are partially set according to $c^1{}_0=0$ and $c^7{}_0=1$.

Figure 19:
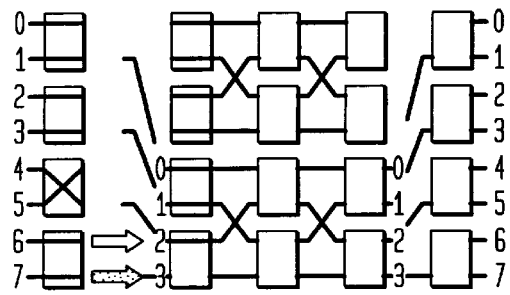

Next, the control sequence bit $c^3{}_0$ corresponding to the $q_1=3^{rd}$ signal inputted on input port #1 of the lower 4×4 Benes subnetwork is set to 1. The signal $q_{k'}=4$ is identified which destined to output port # $d^3{}_2\overline{d^3{}_1}$='01'=1. The control sequence bit $c^4{}_0$ is therefore set to 0. In FIG. 19, the switch states of the second to bottommost and bottommost switches are shown set to the bar state according to $c^3{}_0=1$ and $c^4{}_0=0$.

To form the final routing tags, the control sequence bits thus determined are concatenated to the binary sequence of the destination bits of the corresponding input signal. Thus, the routing tags are as set forth in Table 1 below.

TABLE 1

| Orig. input port# | Control sequence $c_1 c_0$ | Orig. Output port# | Binary rep. of output port# $d_2 d_1 d_0$ | Routing tag $c_1 c_0 d_2 d_1 d_0$ |
| --- | --- | --- | --- | --- |
| 0 | 00 | 3 | 011 | 00 011 |
| 1 | 10 | 7 | 111 | 10 111 |
| 2 | 01 | 1 | 001 | 01 001 |

TABLE 1-continued

| Orig. input port# | Control sequence $c_1 c_0$ | Orig. Output port# | Binary rep. of output port# $d_2 d_1 d_0$ | Routing tag $c_1 c_0 d_2 d_1 d_0$ |
| --- | --- | --- | --- | --- |
| 3 | 11 | 0 | 000 | 11 000 |
| 4 | 10 | 2 | 010 | 10 010 |
| 5 | 00 | 6 | 110 | 00 110 |
| 6 | 01 | 5 | 101 | 01 101 |
| 7 | 11 | 4 | 100 | 11 100 |

Figure 20:
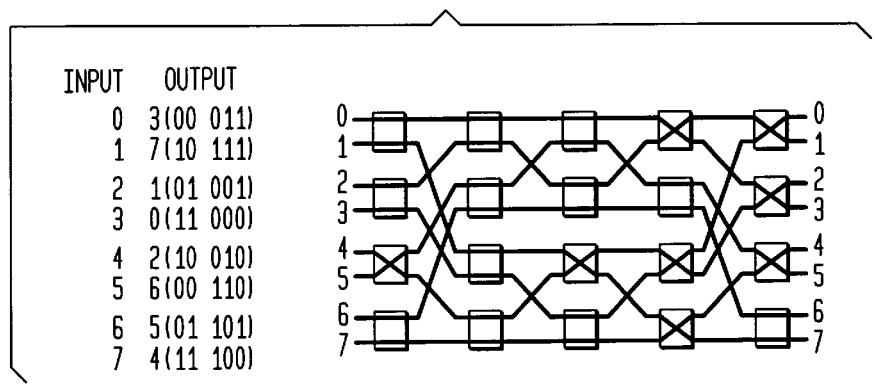
FIG. 20 illustrates a process for assigning complete routing tags by concatenating destination bit sequences to control bit sequences assigned as per FIGS. 12–19.

FIG. 20 shows the Benes network β elements switched as per the routing tags.

Note that for an N×N Benes network, the processing time for setting up the control sequence using the above process is on the order of $O(\log_2 N)$. Thus, little time is required for setting up the routing tags relative to the number of input signals simultaneously switched by the switch fabric. As shown in FIG. 20, one control circuit for generating the routing tags may be implemented with a destination address comparator 91, a memory 92 and a routing tag generator 93. The destination address comparator performs the above iterative steps for the m−1 control stages and each Benes subnetwork having an input stage β element at the respective iterated stage. The destination address comparator 91 can for example be implemented with one or more high speed integer processors or finite state automata. In the course of generating the control sequence bits, the address comparator 91 stores the control sequence bits in the memory 92 which can be implemented with registers. Once the control sequences are complete, the routing tag generator 93, which may be a simple concatenator, forms the final routing tag for each input signal from the control sequences and destination addresses.

MULTIPLE CHANNEL BENES NETWORK ATM CELL SWITCH FABRIC

Figure 21:
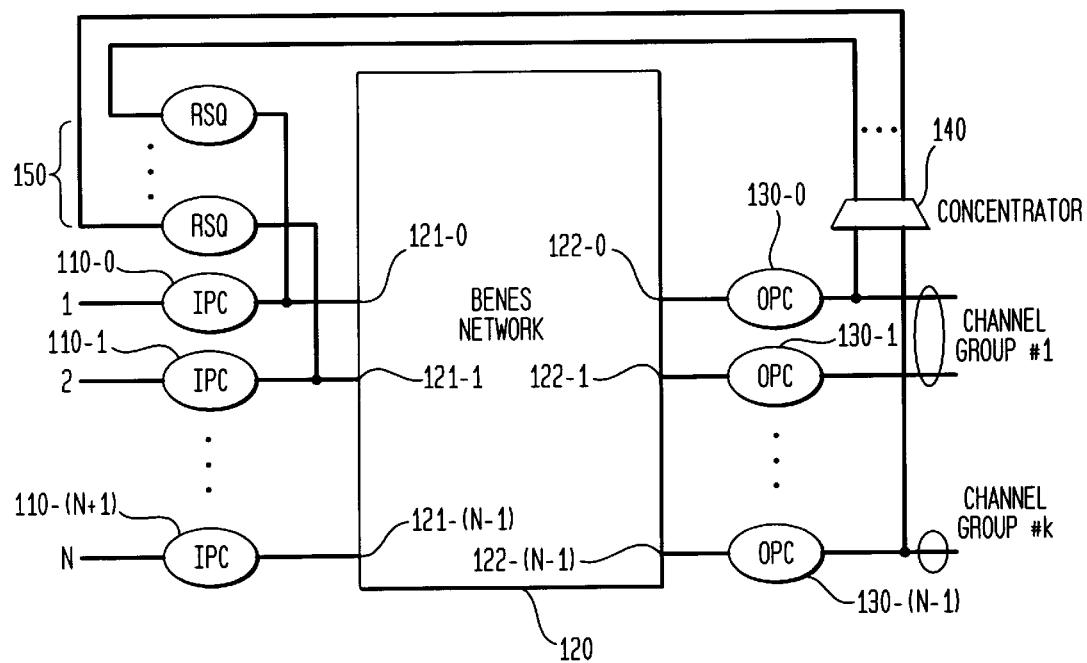
FIG. 21 shows a multiple channel switch according to an embodiment of the invention.

FIG. 21 shows an ATM multiple channel switch 100 according to an embodiment of the present invention. As shown, the switch 100 includes multiple input port controllers 110-0, 110-1, . . . , 110-(N−1), an N×N Benes network 120, multiple output port controllers 130-0, 130-1, . . . ,130-(N−1) concentrator 140 and recirculated shared queues 150 (illustratively contained in the input port controllers 110-0, 110-1, . . . 110-(N−1)). One input port controller 110-0, 100-1, . . . , 110-(N−1) is provided for each input channel (VP or VC) on which cell layer switching is performed. Each input port controller 110-0, 110-1, . . . , 110-(N−1) receives cells from a respective input channel at a queue contained therein. Each input port controller 110-0, 110-1, . . . , 110-(N−1) performs a cell synchronization finction, according to which the receipt of cells is synchronized to an internal switch clock. In addition, the input port controllers 110-0, 110-1, . . . ,110-(N−1) translate the VPI/VCI of incoming cells to the correct outgoing VPI/VCI (e.g., using a routing table). After the correct outgoing VPI/VCI information is identified for a cell (and written in the cell header thereof), the input port controllers 110-0, 110-1, . . . ,110-(N−1) select the correct channel group (corresponding to the outgoing VPI/VCI) and destination output port 122-0, 122-1 , . . . ,122-(N−1) of the Benes network 120. This is described in greater detail below. Each input port controller 110-0, 110-1, . . . ,110-(N−1) also routes a packet from the head of its queue via the Benes network 120. To that end, each input port controller 110-0, 110-1, . . . , 110-(N−1) assigns a routing tag to the cell at the head of the queue. Illustratively, this can be achieved as described above. The input port controllers 110-0, 110-1, . . . , 110-(N−1) may be implemented as processors or finite state automata designed/programmed to achieve the above described functions.

The Benes network 120 receives up to N cell bearing signals from the input port controllers 110-0, 110-1, . . . ,110-(N−1). Each input port controller 110-0, 110-1, . . . ,110-(N−1) is connected to a respective input port 121-0, 121-1, . . . , 121-(N−1) of the Benes network 120. The Benes network routes the inputted cell bearing signals to the output ports 122-0, 122,2, . . . , 122-(N−1) according to the routing tags generated by the input port controllers 110-0, 110-1, . . . , 110-(N−1). Each output port 122-0, 122-1, . . . , 122-(N−1) corresponds to a particular channel (i.e., VC or VP) and outputs the cells for multiplexing onto that corresponding channel. As described in greater detail below, the channels are organized into multiple groups. Each output port 122-0, 122-1, . . . , 122-(N−1) is therefore further associated with a particular one of the groups.

One output port controller 130-0, 130-1, . . . , 130-(N−1) is connected to each output port 122-0, 122-1, . . . , 122-(N−1), respectively of the Benes network 120. The output port controllers 130-0, 130-1, . . . , 130-(N−1) each compare the outgoing channel of the cell, e.g., as indicated by the VPI/VCI in the cell, received from the respective output port 122-0, 122-1, . . . , 122-(N−1) to the group associated with the output port 122-0, 122-1, . . . , 122-(N−1). If the respective output port 122-0, 122-1, . . . , 122-(N−1) from which the cell was received is associated with a channel group that includes the channel of the cell as a member, the cell is outputted from the switch on the channel corresponding to the output port 122-0, 122-1, . . . , 122-(N−1). For reasons discussed below, however, a cell may be purposely routed to the wrong output port 122-0, 122-1, . . . , 122-(N−1), i.e., an output port 122-0, 122-2, . . . , 122-(N−1) associated with a channel group that does not include the channel of the cell as a member. In such a case, the output port controller 130-0, 130-1, . . . , 130-(N−1) outputs the cell to concentrator 140. The output port controllers 130-0, 130-1, . . . , 130-(N−1) may be implemented as processors or finite state automata designed/programmed to achieve the above noted functions.

The concentrator 140 receives each incorrectly routed cell. The concentrator 140 "concentrates", i.e., aggregates the cells into adjacent signal paths or lines. The concentrator 140 then feeds back the cells in parallel, one cell per signal line to the shared recirculated queues of the input port controllers 110-0, 110-1, . . . , 110-(N−1). Each signal line is connected to a mutually differed one of the input port controllers 110-0, 110-1, . . . , 110-(N−1). Thus, each cell is fed back to a mutually different input port controller 110-0, 110-1, . . . , 110-(N−1). By virtue of the concentration performed by the concentrator 140, the cells are received at contiguous, i.e., adjacent, input port controllers 110-0, 110-1, . . . ,110-(N−1). Advantageously, for reasons described below, the cells are received at the contiguous series of input port controllers 110-0, 110-1, . . . , 110-(N−1) which series starts at a first input port controller 110-0 and precedes sequentially according to a predetermined order 110-1, 110-2, etc. The concentrator may be implemented as an arbitration circuit and a selector circuit. The arbitrator utilizes a selection process to control the selector to select the appropriate cells and to concentrate them, i.e., to aggregate them in a contiguous fashion.

As noted above, in a multiple channel switch, cells need not be exclusively switched to their prescribed output channels (i.e., output VC or VP). Rather, for many communications, any channel that conveys cells between the two prescribed nodes on the path of the cell can be used to carry the cell to the next node. That is, suppose three channels are set-up for three communications which each carry cells between a first node and a second node in the course of routing cells for each of the three different channels to respective destination nodes (which may be different nodes). According to a multiple channel switching schema, these three channels are aggregated into a single channel group. Cells received at the first node for any of the three communications are transmitted to the second node on any of the three channels of the channel group, regardless of whether or not the cell corresponds to the same communication as the channel on which it is transmitted.

Such a multiple channel switching methodology is implemented in the switch 100. As shown, the outputs 122-0, 122-1, . . . , 122-(N−1) are organized into multiple channel groups. Within any given channel group, all of the channels carry cells to the same output node, albeit, via different channels. A database is maintained in each input port controller 110-0, 110-1, . . . , 110-(N−1) indicating the organization of channels into channel groups. As noted above, each Benes network output 122-0, 122-1, . . . , 122-(N−1) corresponds to a different channel. Accordingly, the database stored in each input port controller 110-0, 110-1, . . . , 110-(N−1) can relate the Benes matrix output ports 122-0, 12202, . . . , 122-(N−1) to the index assigned to each channel group. For example, suppose that N=8. Furthermore, suppose that the channels are divided into three groups such that the channels of the Benes network 120 output ports #0, 1, 2 are in channel group 1, output ports #3, 4 are in channel group 2 and output ports #5, 6, 7 are in channel group 3. In such a case, the database shown in Table 2 may be stored in each input port controller 110-0, 110-1, . . . , 110-(N−1).

TABLE 2

| Group index | Destination address |
| --- | --- |
| 1 | Output port# 0, 1, 2 |
| 2 | Output port# 3, 4 |
| 3 | Output port# 5, 6, 7 |

Each input port controller 110-0, 110-1, . . . , 110-(N−1) assigns an output port to the cell at the head of its queue depending on the following criterion. Each input port controller 110-0, 110-1, . . . , 110-(N−1) assigns its cell to an available output port 122-0, 122-1, . . . , 122-(N−1) according to a predetermined priority ordering. Illustratively, the priority ordering of assignment is the same as the ordering of the labels, i.e., input port controller 110-0 has the highest priority, input port controller 110-1 has the second highest priority, . . . and input port controller 110-(N−1) has the lowest priority. Advantageously, each input port controller, e.g., the input port controller 110-2, is aware of the destination channel group to which each other input port controller 110-0, 110-1, . . . , 110-(N−1) wishes to transmit its cells. The input port controller 110-2 assigns its cell to a unique output port available for assignment, i.e., not assigned by an input port controller 110-0, 110-1 of a higher priority. If an output port, e.g., the output port 122-(N−1), is available which is associated with the destination channel group to which the input port controller's cell is destined, the input port controller 110-2 assigns the next available output port 122-(N−1) of the correct destination channel group to its cell. It is possible, however, that no output ports associated with the same channel group as the destination channel group of the cell are available for assignment. This would occur because the higher priority input port controllers 110-0 and 110-1 have assigned such output ports to their cells. In such a case, the input port controller 110-2 assigns an "idle channel" (and corresponding output port 122-0, 122-1, . . . , 122-(N−1)) to its cell. An idle channel is a channel associated with a "low demand" destination channel group, i.e., a destination channel group including more channels/output ports 122-0, 122-1, . . . , 122-(N−1) than cells destined to those channels during the particular switching cycle. In short, the input port controller 110-2 assigns an output port associated with the same destination channel group of the cell, if available. If such an output port is not available, the input port controller 110-2 purposely mis-routes the cell to an idle channel not needed by the other input port controllers to correctly route their cells.

As noted above, the output port controllers 130-0, 130-1, . . . , 130-(N−1) are configured to ensure that only correctly routed cells are outputted from the switch 100. Incorrectly routed cells are fed back to the input port controllers 110-0, 110-1, . . . , 110-(N−1) via the concentrator 140. The incorrectly routed cells are received at the series of input controllers 110-0, 110-1, . . . 110-(N−1) starting from the highest priority controller 110-0 and progressing to other input controllers 110-1, 110-(N−1) in order of decreasing priority. Thus, the mis-routed cells have the highest priority in being routed to the correct destination channel group on the next switching cycle.

Consider now a practical routing example wherein the cell at the head of the input queues in each of the input port controllers 110-0, 110-1, . . . , 110-(N−1), for N=8, are to be routed to the following channel groups:

$$\left(\frac{\text{input port \#}}{\text{destination group}}\right) = \begin{pmatrix} 0 & 1 & 2 & 3 & 4 & 5 & 6 & 7 \\ 2 & 1 & 2 & 2 & 1 & 1 & 3 & 1 \end{pmatrix}$$

Input port controller 110-0 (corresponding to input port #0) determines that there is an output port, namely, output port 122-3, available associated with the same destination channel group, i.e., channel group 2, as the cell at the head of the queue of the input port controller 110-0. As such, the input port controller 110-0 assigns the destination output port 122-3 to its cell. Likewise, the input port controller 110-1 assigns output port 122-0 (group 1) to its cell.

The input port controller 110-2 determines that of the two output ports 122-3 and 122-4 associated with the same channel group 2 as its cell, the output port 122-3 is assigned by a higher priority input port controller. Nevertheless, the output port 122-4 is available for assignment. As such the input port controller 110-2 assigns output port 122-4 (group 2) to its cell.

Input port controller 110-3 determines that the only two input ports associated with the channel group of its cell, namely, group 2, are assigned by higher priority input port controllers 110-0 and 110-2. However, only one input port controller, namely, input port controller 110-6, assigns an output port associated with channel group 3, whereas three output ports 122-5, 122-6 and 122-7 are available. As such, the input port controller 110-3 determines that output port 122-6 is idle and assigns output port 122-6 to its cell.

The input port controller 110-4 determines that the output port 122-1, associated with the same channel group 1 as its cell, is available for assignment. The input port controller 110-4 therefore assigns this output port to its cell.

The input port controller 110-5 determines that the output port 122-2, associated with the same channel group 1 as its cell, is available for assignment. The input port controller 110-5 therefore assigns this output port to its cell.

The input port controller 110-6 determines that the output port 122-5, associated with the same channel group 3 as its cell, is available for assignment. The input port controller 110-6 therefore assigns this output port to its cell.

Like, the input port controller 110-3, the input port controller 110-7 determines that no output port is available which is associated with the same channel group 2 as its cell. The input port controller 110-7 furthermore determines that the output 122-7 is idle and assigns this output port to its cell.

With these assignments of output ports, the input port controllers 110-0, 110-1, . . . , 110-7 determine the routing tags for routing their cells through the Benes network 120 to the assigned output ports. Any routing technique, such as the technique described above, may be used. The cells are then outputted from the input port controllers 110-1, 110-2, . . . , 110-7 to the output port controllers 130-0, 130-1, . . . , 130-7 via the Benes network 120 using the routing tags.

The output port controllers 130-0, 130-1, . . . , 130-7 receive the cells and compare the channel (e.g., VCI/VPI in the cell header) to the list of channels in the channel group associated with the channel group of the output 122-0, 122-1, . . . , 122-7 from which the cell was received. At each output port controller, e.g.,the output port controller 130-3, if the cell is outputted from the correct output (i.e., associated with the same channel group as the cell), the output port controller 130-3 outputs the cell to the channel corresponding to the output port 122-3 from which the cell was received. In the example above, the output port controllers 130-0, . . . , 130-5 output their cells to the appropriate channels. The output port controllers 130-6 and 130-7 determine that the .sells received thereat were mis-routed. The output port controllers 130-6 and 130-7 output the mis-routed cells to the concentrator 140.

The concentrator 140 "concentrates" the mis-routed cells. The concentrator 140 outputs the cell received from the output port controller 130-6 to the shared recirculated queue in the input port controller 110-0. On the next switching cycle, this cell is placed at the head of the input queue in the input port controller 110-0. The concentrator 140 outputs the cell received from the output port controller 130-7 to the shared recirculated queue of the input port controller 110-1. On the next switching cycle, this cell is placed at the head of the input queue of the input port controller 110-1. Thus, the mis-routed cells are given highest priority in the next switching cycle.

Consider the next switching cycle. As noted above, the input port controllers 110-0 and 110-1 desire to route the fed back cells (now at the head of their respective input queues) to the channel groups 2 and 1, respectively. Assume that the input port controller 110-2 desires to route its cell to the channel group 2. Neither of the input port controllers 110-3 or 110-4 has a cell at the head of its queue. Input port controller 110-5 desires to route its cell to the channel group 1. Input port controller 110-6 desires to route its cell to the channel group 3 and input port controller 110-7 desires to route its cell to the channel group 1. The assignment of output ports is as follows:

| input port controller | 110-0 | 110-1 | 110-2 | 110-3 | 110-4 | 110-5 | 110-6 | 110-7 |
|---|---|---|---|---|---|---|---|---|
| output port | 122-3 | 122-0 | 122-4 | 122-6 | 122-7 | 122-1 | 122-5 | 122-2 |

Note that the input port controllers 110-3 and 110-4 select idle ports for purposes of simplifying the assignment of routing tags. In this example, there are no mis-routed cells to feed back.

CONCLUSION

In short, a method and system are provided for assigning routing tag bits for routing signals through a Benes network. Illustratively, the Benes network comprises an input stage and an output stage. The input and output stages each comprise a column of 2×2 β elements. Each 2×2 β element routes an inputted signal to an upper output if the control sequence bit is 0 and routes the inputted signal to a lower output if the control sequence bit is 1. Each signal inputted to the Benes network is associated with control sequence bits, including one control sequence bit for each particular control stage of the Benes network. For a particular Benes subnetwork having input stage β elements in a particular control stage of the Benes network, the following steps are performed. A 0 is assigned to a control sequence bit associated with a signal $q_0$ received at an upper input of a topmost input stage β element. A 1 is assigned to a control sequence bit associated with a signal $q_k$ received at the same output stage β element as the signal $q_0$. A 1 is assigned to a control sequence bit associated with a signal $q_1$ received at a lower input of the topmost input stage β element. A 0 to is assigned to a control sequence bit associated with a signal $q_{k'}$ received at the same output stage β element as the signal $q_1$. For at least one signal $q_p$ for which no control sequence bit is yet assigned, either a 0 or a 1 is assigned to the control sequence bit associated with the signal $q_p$. The complement of the chosen control sequence bit is assigned to a control sequence bit associated with a signal $q_{k''}$ received at the same output stage β element as the signal $q_p$.

Illustratively, this process is repeated for each Benes subnetwork having input stage β elements in each control stage. Thereafter, the destination output port of each signal, as represented in binary form, is appended to the end of each control sequence thus determined for each respective signal. This forms the routing tag for routing the signal through the Benes network.

A method and system are also provided for routing received cells through Benes switch fabric. A plurality of output channels are organized into a plurality of channel groups, wherein each of the channels groups is associated with one or more unique output ports of a Benes network. A plurality of cells destined to one or more of the plurality of channel groups is received at plural input queues. A different output port of the Benes network is selected for one or more of the input queues that contains a cell. Then, one cell is switched from each of one or more input queues through the Benes network to the respective selected output port.

Illustratively, the selection of output ports is performed for each input in a specific predetermined order. Only an output port not yet selected by another input queue, associated with a channel group to which a cell to outputted from the queue is destined, may be selected, if such an output is available. Otherwise, if each output associated with the destination channel group has been selected by preceding input queues, an idle output of the Benes network of a channel group containing more channels than cells, to be outputted from the input queues, is selected.

Illustratively, when an idle, i.e., incorrect output port is selected, such purposely "wrongly" routed cells are fed back to the head of the input queues for re-routing.

Finally, the above-discussion is intended to be merely illustrative of the invention. Numerous alternative embodiments may be devised by those having ordinary skill in the art without departing from the spirit and scope of the following claims.

We claim:

1. A method for routing received cells through a switch fabric comprising:
    (a) organizing a plurality of output channels into a plurality of channel groups, wherein each of said channels groups is associated with one or more unique output ports of a Benes network,
    (b) receiving at a plurality of input queues, a plurality of cells destined to one or more of said plurality of channel groups,
    (c) each switch cycle, assigning a different output port of said Benes network to each head cell at a head of one of said input queues that contains a cell, wherein said output ports are uniquely assigned during a switch cycle so that only one of said head cells is assigned any particular output port, at least one of the assigned output ports being associated with a channel group destination of said head cell to which it is assigned.
    prior to generating routing tags and switching cells during one of said switch cycles, using an identifier uniquely and preliminarily assigned to each of said output ports, generating a routing tag for each of said head cells based on said identifier associated with said assigned output port, wherein said identifiers are preliminarily assigned to said output ports in a unique fashion so that each output port is assigned a unique identifier, the unique assignment of output ports to said head cells during one of said switch cycles before assigning routing tags and switching said head cells thereby avoiding output port contention within said Benes network prior to switching said head cells through said Benes network, and
    (d) using each of said generated routing tags, switching said head cells through said Benes network to the respective assigned output port during said switch cycle.

2. The method of claim 1 wherein said step (c) further comprises:
    (c1) performing said step (c) for each input queue of said one or more input queues in a specific predetermined order,
    (c2) selecting an output of said Benes network, not yet selected by another input queue, associated with a channel group to which a cell to outputted from said queue is destined, if such an output is available, and
    (c3) if each output associated with said destination channel group has been selected by preceding input queues, selecting an idle output of said Benes network of a channel group containing more channels than cells, to be outputted from said one or more input queues, destined to said channel group.

3. The method of claim 1 further comprising the steps of:
    (e) feeding back to said plurality of input queues each cell outputted from said output ports of said Benes network destined to a channel group other than said channel group associated with said output port of said Benes network from which said cell is outputted.

4. The method of claim 3 further comprising the step of:
    (f) concentrating the cells fed back to said input ports.

5. The method of claim 3 further comprising the steps of:
    (f) receiving each fed back cell at the head of a different one of said input queues,
    (g) repeating said steps (b)–(d)
    (h) performing said step (c) for each of said fed back cells prior to performing said step (c) for cells received during said step (b).

6. The method of claim 1 further comprising the step of:
(e) maintaining at each of said input queues a table indicating which outputs are associated with each of said channel groups.

7. The method of claim 1 wherein said Benes network comprises an input stage and an output stage, said input and output stages each comprising a column of 2×2 β elements which each comprise an upper input, a lower input, an upper output and a lower output, said step (d) comprising the steps of:
routing each signal, inputted to a particular Benes subnetwork of said Benes network, through a respective input stage β element of said particular Benes subnetwork as follows:
(d1) routing a signal $q_0$ received at an upper input of a topmost input stage β element to an upper output of said topmost input stage β element and routing a signal $q_k$, received at the same output stage β element as said signal $q_0$, to a lower output of an input stage β element that receives said signal $q_k$,
(d2) routing a signal $q_1$ received at a lower input of said topmost input stage β element to a lower output of said topmost input stage β element, and routing a signal $q_{k'}$, received at the same output stage β element as said signal $q_1$, to an upper output of an input stage β element that receives said signal $q_{k'}$, and
(d3) for at least one signal $q_p$ not routed in steps (a)-(b), choosing to route said signal $q_p$ to either the upper output or the lower output of an input stage β element that receives said signal $q_p$ and routing a signal $q_{k''}$, received at the same output stage β element as said signal $q_p$, to an opposite output, of an input stage β element that receives said signal $q_{k''}$, as said output chosen for said signal $q_p$.

8. A multiple channel cell switch fabric comprising:
a plurality of output channels organized into a plurality of channel groups, wherein each of said channels groups is associated with one or more unique output ports of a Benes network,
a plurality of input port controllers comprising queues for receiving a plurality of cells destined to one or more of said plurality of channel groups, said input port controllers for, each switch cycle, assigning a different output port of a Benes network to each head cell at the head of each of said input queues that contains a cell, wherein said output ports are uniquely assigned during a switch cycle so that only one of said head cells is assigned any particular output port, at least one of the assigned output ports being associated with a channel group destination of said head cell to which it is assigned, said input port controllers also for, prior to generating routing tags and switching cells during one of said switch cycles, using an identifier uniquely and preliminarily assigned to each of said output ports, generating a routing tag for each of said head cells based on said identifier associated with the assigned output port, wherein said identifiers are preliminarily assigned to said output ports in a unique fashion so that each output port is assigned a unique identifier, the unique assignment of output ports for said head cells during one of said switch cycles before assigning routing tags and switching said head cells thereby avoiding output port contention within said Benes network prior to switching said head cells through said Benes network, and
a Benes network comprising a plurality of β elements for, using said routing tags, switching said head cells each of said one or more input queues through said Benes network to the respective assigned output port during said switch cycle.

9. The switch fabric of claim 8 wherein said input port controllers are also for assigning a different output port for head cell of said one or more input queues in a specific predetermined order, for selecting an output of said Benes network, not yet selected by another input controller, associated with a channel group to which a head cell to outputted from said input queue is destined, if such an output is available, and if each output associated with said destination channel group has been selected by preceding input port controllers, for selecting an idle output of said Benes network of a channel group containing more channels than head cells, to be outputted from said one or more input queues, destined to said channel group.

10. The switch fabric of claim 8 further comprising:
feedback circuitry for feeding back to said plurality of input queues each cell outputted from said output ports of said Benes network destined to a channel group other than said channel group associated with said output port of said Benes network from which said cell is outputted.

11. The switch fabric of claim 10 further comprising:
a concentrator for concentrating the cells fed back to said input ports.

12. The switch fabric of claim 10 wherein said feedback circuitry is connected to said input queues so that each fed back cell is received at the head of a different one of said input queues, said input queues receiving a second plurality of cells destined to one or more of said plurality of channel groups, selecting a different output port of said Benes network for one or more of cells of said second plurality but selecting a different output port of said Benes network for each of the fed back cells before selecting output ports for said cells of said second plurality.

13. A method for routing received cells through a switch fabric comprising:
(a) organizing a plurality of output channels into a plurality of channel groups, wherein each of said channels groups is associated with one or more unique output ports of a Benes network,
(b) receiving at a plurality of input queues, a plurality of cells destined to one or more of said plurality of channel groups,
(c) selecting a different output port of said Benes network for one or more of said input queues that contains a cell, and
(d) switching one cell from each of said one or more input queues through said Benes network to said respective selected output port, wherein said Benes network comprises an input stage and an output stage, said input and output stages each comprising a column of 2×2 β elements which each comprise an upper input, a lower input, an upper output and a lower output, said step (d) comprising the steps of routing each signal, inputted to a particular Benes subnetwork of said Benes network, through a respective input stage β element of said particular Benes subnetwork as follows:
(d1) routing a signal $q_0$ received at an upper input of a topmost input stage β element to an upper output of said topmost input stage β element and routing a signal $q_k$, received at the same output stage β element as said signal $q_0$, to a lower output of an input stage β element that receives said signal $q_k$,
(d2) routing a signal $q_1$ received at a lower input of said topmost input stage β element to a lower output of said topmost input stage β element, and routing a signal $q_{k'}$, received at the same output stage β element as said signal $q_1$, to an upper output of an input stage β element that receives said signal $q_{k'}$, and (d3) for at least one signal $q_p$ not routed in steps (a)-(b), choosing to route said signal $q_p$ to either the upper output or the lower output of an input stage β element that receives said signal $q_p$ and routing a signal $q_{k''}$, received at the same output stage β element as said signal $q_p$, to an opposite output, of an input stage β element that receives said signal $q_{k''}$, as said output chosen for said signal $q_p$.

14. The method of claim 13 wherein said step (c) further comprises:

(c1) performing said step (c) for each input queue of said one or more input queues in a specific predetermined order, (c2) selecting an output of said Benes network, not yet selected by another input queue, associated with a channel group to which a cell to outputted from said queue is destined, if such an output is available, and (c3) if each output associated with said destination channel group has been selected by preceding input queues, selecting an idle output of said Benes network of a channel group containing more channels than cells, to be outputted from said one or more input queues, destined to said channel group.

15. The method of claim 13 further comprising the steps of:

(e) feeding back to said plurality of input queues each cell outputted from said output ports of said Benes network destined to a channel group other than said channel group associated with said output port of said Benes network from which said cell is outputted.

16. The method of claim 15 further comprising the step of:

(f) concentrating said cells fed back to said input ports.

17. The method of claim 15 further comprising the steps of:

(f) receiving each fed back cell at the head of a different one of said input queues, (g) repeating said steps (b)–(d)

(h) performing said step (c) for each of said fed back cells prior to performing said step (c) for cells received during said step (b).

18. The method of claim 13 further comprising the step of:

(e) maintaining at each of said input queues a table indicating which outputs are associated with each of said channel groups.

19. A multiple channel cell switch fabric comprising:

a plurality of output channels organized into a plurality of channel groups, wherein each of said channels groups is associated with one or more unique output ports of a Benes network, a plurality of input queues for receiving a plurality of cells destined to one or more of said plurality of channel groups, and for selecting a different output port of a Benes network for one or more cells at the head of each of said input queues that contains a cell, and a Benes network comprising a plurality of β elements for switching one cell from each of said one or more input queues through said Benes network to the respective selected output port, said Benes network comprising an input stage and an output stage, said input and output stages each comprising a column of 2×2 β elements which each comprise an upper input, a lower input, an upper output and a lower output, said Benes network routing each signal, inputted to a particular Benes subnetwork of said Benes network, through a respective input stage β element of said particular Benes subnetwork by:

routing a signal $q_o$ received at an upper input of a topmost input stage β element to an upper output of said topmost input stage β element and routing a signal $q_k$, received at the same output stage β element as said signal $q_0$, to a lower output of an input stage β element that receives said signal $q_k$, routing a signal $q_1$ received at a lower input of said topmost input stage β element to a lower output of said topmost input stage β element, and routing a signal $q_{k'}$, received at the same output stage β element as said signal $q_1$, to an upper output of an input stage β element that receives said signal $q_{k'}$, and for at least one signal $q_p$ not routed by said topmost input stage β element, choosing to route said signal $q_p$ to either the upper output or the lower output of an input stage β element that receives said signal $q_p$ and routing a signal $q_{k''}$, received at the same output stage β element as said signal $q_p$ to an opposite output, of an input stage β element that receives said signal $q_{k''}$, as said output chosen for said signal $q_p$.

20. The switch fabric of claim 19 wherein said input queues are also for selecting a different output port for each input queue of said one or more input queues in a specific predetermined order, for selecting an output of said Benes network, not yet selected by another input queue, associated with a channel group to which a cell to outputted from said queue is destined, if such an output is available, and if each output associated with said destination channel group has been selected by preceding input queues, for selecting an idle output of said Benes network of a channel group containing more channels than cells, to be outputted from said one or more input queues, destined to said channel group.

21. The switch fabric of claim 19 further comprising:

feedback circuitry for feeding back to said plurality of input queues each cell outputted from said output ports of said Benes network destined to a channel group other than said channel group associated with said output port of said Benes network from which said cell is outputted.

22. The switch fabric of claim 21 further comprising:

a concentrator for concentrating the cells fed back to said input ports.

23. The switch fabric of claim 21 wherein said feedback circuitry is connected to said input queues so that each fed back cell is received at the head of a different one of said input queues, said input queues receiving a second plurality of cells destined to one or more of said plurality of channel groups, selecting a different output port of said Benes network for one or more of cells of said second plurality but selecting a different output port of said Benes network for each of said fed back cells before selecting output ports for said cells of said second plurality.

* * * * *